(12) United States Patent
Kim et al.

(10) Patent No.: US 12,314,364 B2
(45) Date of Patent: May 27, 2025

(54) ELECTRONIC DEVICE AND VEHICLE DRIVER AUTHENTICATION METHOD BY THE ELECTRONIC DEVICE

(71) Applicant: SAMSUNG ELECTRONICS CO., LTD., Suwon-si (KR)

(72) Inventors: Byungwook Kim, Suwon-si (KR); Hyunsik Ki, Suwon-si (KR); Sanghoon Lee, Suwon-si (KR); Woong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 227 days.

(21) Appl. No.: 18/075,926

(22) Filed: Dec. 6, 2022

(65) Prior Publication Data
US 2023/0177130 A1   Jun. 8, 2023

Related U.S. Application Data

(63) Continuation of application No. PCT/KR2022/019516, filed on Dec. 2, 2022.

(30) Foreign Application Priority Data

Dec. 7, 2021  (KR) .................. 10-2021-0174015
Jan. 24, 2022  (KR) .................. 10-2022-0010226

(51) Int. Cl.
*G06F 21/32* (2013.01)
*B60W 40/08* (2012.01)

(52) U.S. Cl.
CPC ............. *G06F 21/32* (2013.01); *B60W 40/08* (2013.01); *B60W 2540/043* (2020.02)

(58) Field of Classification Search
None
See application file for complete search history.

(56) References Cited

U.S. PATENT DOCUMENTS

| 10,074,223 B2 | 9/2018 | Newman |
| 11,433,907 B2 | 9/2022 | Jeon et al. |
| (Continued) | | |

FOREIGN PATENT DOCUMENTS

| JP | 5588327 | 9/2014 |
| KR | 10-1698103 | 1/2017 |
| (Continued) | | |

*Primary Examiner* — Raqiul A Choudhury
(74) *Attorney, Agent, or Firm* — Nixon & Vanderhye, P.C.

(57) ABSTRACT

Disclosed is an electronic device including: a first authentication module configured to determine whether a driver corresponds to a valid user of a vehicle, according to an artificial intelligence (AI)-based authentication process, a control module configured to select a low-speed authentication process or a high-speed authentication process based on a speed of the vehicle, based on determining through the AI-based authentication process that the driver does not correspond to the valid user, and a second authentication module configured to determine whether the driver corresponds to the valid user, according to the authentication process selected by the control module, wherein the AI-based authentication process is configured to be performed based on a neural network configured to process sensing data collected by a sensor of at least one of the vehicle or a mobile device of the driver while the driver is using the vehicle.

15 Claims, 28 Drawing Sheets

(56) References Cited

U.S. PATENT DOCUMENTS

| | | |
|---|---|---|
| 11,500,974 B2 | 11/2022 | Kim |
| 11,599,113 B2 * | 3/2023 | Shashua ............ G08G 1/096805 |
| 2018/0060375 A1 * | 3/2018 | Blank ..................... G06F 17/18 |
| 2020/0022065 A1 * | 1/2020 | Yan ......................... H04W 4/42 |
| 2020/0079320 A1 | 3/2020 | Lacoss-Arnold |
| 2020/0406860 A1 * | 12/2020 | Mai ......................... B60R 25/31 |
| 2021/0155202 A1 | 5/2021 | Smyth et al. |
| 2021/0234767 A1 | 7/2021 | Ricci et al. |
| 2021/0266740 A1 | 8/2021 | Choi |
| 2021/0347328 A1 | 11/2021 | Bhattacharya et al. |
| 2022/0091231 A1 * | 3/2022 | Regani .................... G01S 7/006 |
| 2022/0161815 A1 * | 5/2022 | Van Beek ....... B60W 60/00274 |

FOREIGN PATENT DOCUMENTS

| | | |
|---|---|---|
| KR | 10-2018-0018953 | 2/2018 |
| KR | 10-2081266 | 2/2020 |
| KR | 10-2020-0128285 | 11/2020 |
| KR | 10-2021-0073686 | 6/2021 |
| WO | 2021/236332 | 11/2021 |

* cited by examiner

FIG. 17

| VALID USER | PARAMETER SET |
|---|---|
| A | FIRST PARAMETER SET |
| B | SECOND PARAMETER SET |
| C | THIRD PARAMETER SET |

ELECTRONIC DEVICE AND VEHICLE DRIVER AUTHENTICATION METHOD BY THE ELECTRONIC DEVICE

CROSS-REFERENCE TO RELATED APPLICATIONS

This application is a continuation of International Application No. PCT/KR2022/019516 designating the United States, filed on Dec. 2, 2022, in the Korean Intellectual Property Receiving Office and claiming priority to Korean Patent Application No. 10-2021-0174015, filed on Dec. 7, 2021, in the Korean Intellectual Property Office, and to Korean Patent Application No. 10-2022-0010226, filed on Jan. 24, 2022, in the Korean Intellectual Property Office, the disclosures of all of which are incorporated by reference herein in their entireties.

BACKGROUND

Field

The disclosure relates to an electronic system of a vehicle, and for example, to an electronic device mounted on a vehicle to authenticate a driver of the vehicle, and a method performed by the electronic device.

Description of Related Art

Traditionally, a vehicle key is required to use a vehicle. Using the key, a driver may open a door of the vehicle and start the vehicle to move the vehicle.

Due to the current development of digital keys, the driver may use the vehicle by inputting a password or biometric data of the driver to a mobile device or a vehicle terminal. However, although the driver needs to be additionally authenticated to use various types of applications installed in the vehicle terminal (e.g., a navigation system), the digital-key-based driver authentication, which operates based on a body motion of the driver, can pose a safety threat while the vehicle is moving.

In addition, due to the popularization of car-sharing services, the number of cases in which several users share one vehicle is increasing. However, a valid user of the vehicle can arbitrarily grant permission to a user who is unauthorized to use the vehicle, or the digital keys can be stolen, and thus preventive measures therefor are required.

For example, when the vehicle is usable based on a password, and when the password is shared by several users, a user who is unauthorized to use the vehicle may use the vehicle. Also, when the vehicle is usable based on biometric identification such as fingerprint identification, because driver authentication is performed only once, a driver who has changed after the authentication may not be blocked from using the vehicle, and thus, there is a high risk of improper use of an authentication device when stolen.

Therefore, in addition to the digital-key-based driver authentication, a method of repeatedly and automatically authenticating a user of a vehicle is required.

SUMMARY

Embodiments of the disclosure provide an electronic device and a vehicle driver authentication method by the electronic device, the device and method being capable of repeatedly and safely authenticating a driver through an artificial intelligence (AI)-based authentication process while a vehicle is moving.

Embodiments of the disclosure provide an electronic device and a vehicle driver authentication method by the electronic device, the device and method being capable of safely re-authenticating a driver in consideration of a speed of a vehicle when authentication of the driver through an AI-based authentication process fails.

Embodiments of the disclosure provide an electronic device and a vehicle driver authentication method by the electronic device, the device and method being capable of preventing/reducing use of a vehicle by an unauthorized user to use the vehicle, by repeatedly authenticating a driver.

According to an example embodiment of the disclosure, an electronic device mounted on a vehicle to authenticate a driver includes: a first authentication module configured to determine whether the driver corresponds to a valid user of the vehicle according to an artificial intelligence (AI)-based authentication process, a control module configured to select a low-speed authentication process or a high-speed authentication process based on a speed of the vehicle based on determining through the AI-based authentication process that the driver does not correspond to the valid user, and a second authentication module configured to determine whether the driver corresponds to the valid user, according to the authentication process selected by the control module, wherein the AI-based authentication process is performed based on a neural network configured to process sensing data collected by a sensor of at least one of the vehicle or a mobile device of the driver while the driver is using the vehicle.

Using an electronic device and a vehicle driver authentication method by the electronic device, according to an example embodiment of the disclosure, a driver may be repeatedly and safely authenticated through an artificial intelligence (AI)-based authentication process while a vehicle is moving.

Using an electronic device and a vehicle driver authentication method by the electronic device, according to an example embodiment of the disclosure, a driver may be safely re-authenticated in consideration of a speed of a vehicle when authentication of the driver through an AI-based authentication process fails.

Using an electronic device and a vehicle driver authentication method by the electronic device, according to an example embodiment of the disclosure, use of a vehicle by a user who is not authorized to use the vehicle may be prevented/reduced by repeatedly authenticating a driver.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 17 is a diagram illustrating example parameter sets corresponding to a plurality of valid users according to various embodiments;

DETAILED DESCRIPTION

Figure 1:
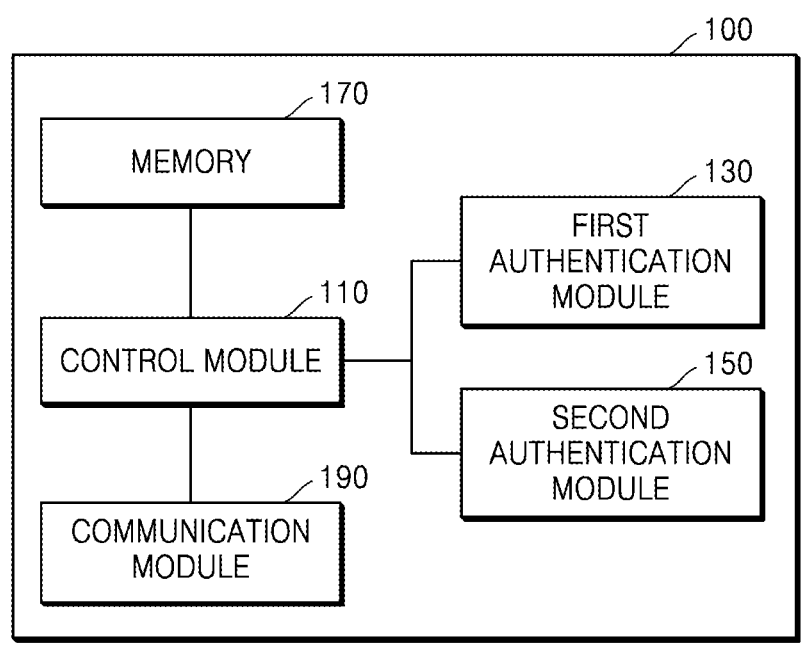
FIG. 1 is a block diagram of illustrating an example configuration of an electronic device according to various embodiments.

While various example embodiments of the disclosure are susceptible to various modifications and alternative forms, embodiments of the disclosure are shown by way of example in the drawings and will herein be described in greater detail. It should be understood, however, that there is no intent to limit embodiments of the disclosure to the particular forms disclosed. Embodiments of the disclosure cover all modifications, equivalents, and alternatives falling within the scope of the disclosure.

In the following description of the disclosure, a detailed description of known functions and configurations incorporated herein may be omitted when it may make the subject matter of the disclosure unclear. It will be understood that the terms "first", "second", etc. used herein are only to distinguish one element from another.

Throughout the disclosure, the expression "at least one of a, b or c" indicates only a, only b, only c, both a and b, both a and c, both b and c, all of a, b, and c, or variations thereof.

It will be also understood, in the disclosure, that when an element is referred to as being "connected" or "coupled" to another element, it may be directly connected or coupled to the other element or be connected or coupled to the other element through an intervening element, unless the context clearly indicates otherwise.

In the disclosure, two or more elements expressed as "units", "modules", or the like may be combined into one element, or one element may be divided into two or more elements for subdivided functions. Each element described herein may not only perform main functions thereof but also additionally perform some or all functions of other elements, and some main functions of each element may be exclusively performed by another element.

As used herein, "authentication" may refer to a process of verifying whether a driver corresponds to a valid user.

A "driver" may refer to a user who is using a vehicle.

A "valid user" may refer to a user who is authorized to use a vehicle.

An "image" may refer to a still image, a moving image including a plurality of consecutive still images (or frames), or a video.

A "neural network (NN)" may refer to a representative example of an artificial neural network model that mimics brain nerves, and is not limited to an artificial neural network model using a specific algorithm. The neural network may also be referred to as a deep neural network (DNN).

A "parameter" may refer to a value used for calculation of each layer or node included in a neural network, and may include, for example, a weight used when an input value is applied to a certain calculation expression. The parameter may be expressed in the form of a matrix. The parameter is a value set as a result of training, and may be updated using training data when necessary.

FIG. 1 is a block diagram illustrating an example configuration of an electronic device 100 according to various embodiments.

Referring to FIG. 1, the electronic device 100 may include a control module (e.g., including various circuitry, e.g., processing circuitry) 110, a first authentication module (e.g., including various processing circuitry and/or executable program instructions) 130, a second authentication module (e.g., including various processing circuitry and/or executable program instructions) 150, a memory 170, and a communication module (e.g., including communication circuitry) 190.

The control module 110, the first authentication module 130, the second authentication module 150, and the communication module 190 may be implemented as a processor. The processor may also be referred to as an electronic control unit (ECU).

The control module 110, the first authentication module 130, the second authentication module 150, and the communication module 190 may operate based on one or more instructions stored in the memory 170.

The control module 110 may include various circuitry (e.g., processing circuitry) and controls operations of the first authentication module 130, the second authentication module 150, the memory 170, and the communication module 190.

As described below, the control module 110 may determine an authentication process to be used to authenticate a driver from among a plurality of authentication processes, and determine whether the driver corresponds to a valid user, through the first authentication module 130 or the second authentication module 150 according to the determined authentication process.

The memory 170 may have prestored therein information about a valid user, and the control module 110 may determine whether the driver corresponds to the prestored valid user, through the first authentication module 130 or the second authentication module 150.

The first authentication module 130 authenticates the driver according to an artificial intelligence (AI)-based authentication process.

The AI-based authentication process is a process of automatically authenticating a driver using a neural network without requiring a specific action of the driver (e.g., an arm or hand motion).

The first authentication module 130 may determine whether the driver corresponds to a valid user, by applying, to the neural network, sensing data obtained by a sensor of at least one of a vehicle or a mobile device of the driver.

The sensor may include at least one of an acceleration sensor, a gyro sensor, a screen sensor, a camera, a microphone, or a biosensor.

As the sensors used in the AI-based authentication process, initially, the acceleration sensor and the gyro sensor measure an acceleration and an angular velocity, respectively. As an example, the acceleration sensor and the gyro sensor mounted on the mobile device measure an acceleration and an angular velocity of the mobile device as the mobile device moves, and the acceleration sensor and the gyro sensor mounted on the vehicle measure an acceleration and an angular velocity of the vehicle as the vehicle moves.

The screen sensor detects manipulation of the driver on a display of the mobile device or a terminal connected to the vehicle (e.g., a navigation terminal; hereinafter referred to as a vehicle terminal).

For example, the screen sensor may detect at least one of a location of touch, a duration of touch, an intensity of touch, or a length of drag by the driver on the display of the mobile device or the vehicle terminal. The screen sensor may further detect the type of an application accessed by the driver, information input by the driver through the application, a web page accessed by the driver, or the like, based on manipulation of the driver on the display of the mobile device or the vehicle terminal.

The camera captures an image of the driver, and the microphone records voice of the driver. Because an image including a body part, e.g., the face, of the driver may be helpful to authenticate the driver, a camera at a fixed location of the vehicle may be mostly used in the AI-based authentication process.

The biosensor senses biometric data of the driver. For example, the biosensor may sense an electrocardiogram (ECG), a photoplethysmogram (PPG), or a blood pressure of the driver. In an embodiment of the disclosure, the biosensor may be attached to the driver to sense the biometric data.

The neural network used in the AI-based authentication process may output data indicating whether the driver corresponds to a valid user, by processing the sensing data according to parameters set through training.

The first authentication module 130 may determine whether the driver corresponds to a valid user, based on the output data of the neural network.

As described in greater detail below, the neural network may include a plurality of sub-neural networks configured to process sensing data obtained from different types of sensors. For example, a sub-neural network may process the sensing data collected by the acceleration sensor, and another sub-neural network may process the sensing data collected by the gyro sensor. In this case, the first authentication module 130 may determine whether the driver corresponds to a valid user, by combining the data output from the plurality of sub-neural networks.

As another example, the neural network may further include an integration neural network configured to process the data output from the plurality of sub-neural networks. The integration neural network may output data indicating whether the driver corresponds to a valid user, by processing the output data of the plurality of sub-neural networks according to parameters set through training.

In an embodiment of the disclosure, the neural networks used in the AI-based authentication process may be stored in the electronic device 100, the mobile device, and a server in a distributed manner, and locations where the neural networks are stored will be described below with reference to FIGS. 18 and 19.

The second authentication module 150 may authenticate the driver in a different authentication process depending on a speed of the vehicle.

In an embodiment of the disclosure, the second authentication module 150 may select a low-speed authentication process or a high-speed authentication process by comparing the speed of the vehicle to a critical speed.

For example, the second authentication module 150 may authenticate the driver in the low-speed authentication process when the speed of the vehicle is lower than the critical speed, or authenticate the driver in the high-speed authentication process when the speed of the vehicle is higher than or equal to the critical speed.

As described in greater detail below, the low-speed authentication process requires, for example, an arm motion of the driver to input a password or biometric data, whereas the high-speed authentication process does not require such arm motion of the driver and thus does not disturb driving of the vehicle moving at high speed.

The communication module 190 may include various communication circuitry and transmits and/or receives data to or from the mobile device and/or the server. As an example, the communication module 190 may transmit or receive the sensing data to or from the mobile device and/or the server. As another example, when the neural networks used in the AI-based authentication process are stored in the mobile device and/or the server in a distributed manner, the communication module 190 may transmit or receive the output data of the neural networks to or from the mobile device and/or the server.

According to an embodiment of the disclosure, the electronic device 100 may authenticate the driver based on the AI-based authentication process, the low-speed authentication process, and the high-speed authentication process, and a situation in which different authentication processes are applied will now be described with reference to FIG. 2.

Figure 2:
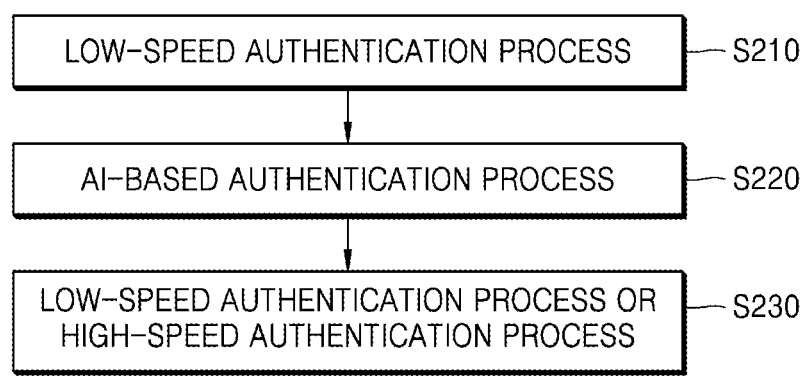
FIG. 2 is a flowchart illustrating an example order of driver authentication by an electronic device, according to various embodiments.

FIG. 2 is a flowchart illustrating an example order of driver authentication by the electronic device 100, according to various embodiments.

To use a vehicle, a driver needs to open a door of the vehicle and start the vehicle. When the driver opens the door of the vehicle or starts the vehicle, the electronic device 100 authenticates the driver according to a low-speed authentication process (S210).

Because the vehicle is stationary before moving, the low-speed authentication process may be used to authenticate the driver. When it is determined according to the low-speed authentication process that the driver is not a valid user, the electronic device 100 may restrict use of the vehicle by the driver.

After the driver is determined as a valid user according to the low-speed authentication process, the electronic device 100 authenticates the driver according to an AI-based authentication process while the vehicle is moving (S220).

In order not to disturb driving of the driver while the vehicle is moving, the electronic device 100 automatically authenticates the driver according to the AI-based authentication process.

When the authentication of the driver succeeds according to the AI-based authentication process, the electronic device 100 may periodically authenticate the driver according to the AI-based authentication process. However, when the authentication of the driver fails according to the AI-based authentication process, the electronic device 100 authenticates the driver in the low-speed authentication process or a high-speed authentication process depending on a speed of the vehicle (S230).

For example, the electronic device 100 authenticates the driver according to the low-speed authentication process when the speed of the vehicle is lower than a critical speed, or authenticates the driver according to the high-speed authentication process when the speed of the vehicle is higher than or equal to the critical speed.

When the authentication of the driver succeeds according to the low-speed authentication process or the high-speed authentication process, the electronic device 100 may authenticate the driver according to the AI-based authentication process again, and authenticate the driver according to the AI-based authentication process, or according to the low-speed authentication process or the high-speed authentication process in consideration of the speed of the vehicle, based on the authentication result.

When the authentication of the driver fails according to the low-speed authentication process or the high-speed authentication process, the electronic device 100 may determine that a user who is unauthorized to use the vehicle is driving the vehicle, and perform an operation for restricting use of the vehicle by the driver.

In an embodiment of the disclosure, the electronic device 100 may transmit a message indicating that an unauthorized user is driving the vehicle, to a phone number of a prestored valid user or a police station.

In an embodiment of the disclosure, the electronic device 100 may stop the vehicle in a nearby parking area by activating an autonomous driving function of the vehicle.

Figure 3:
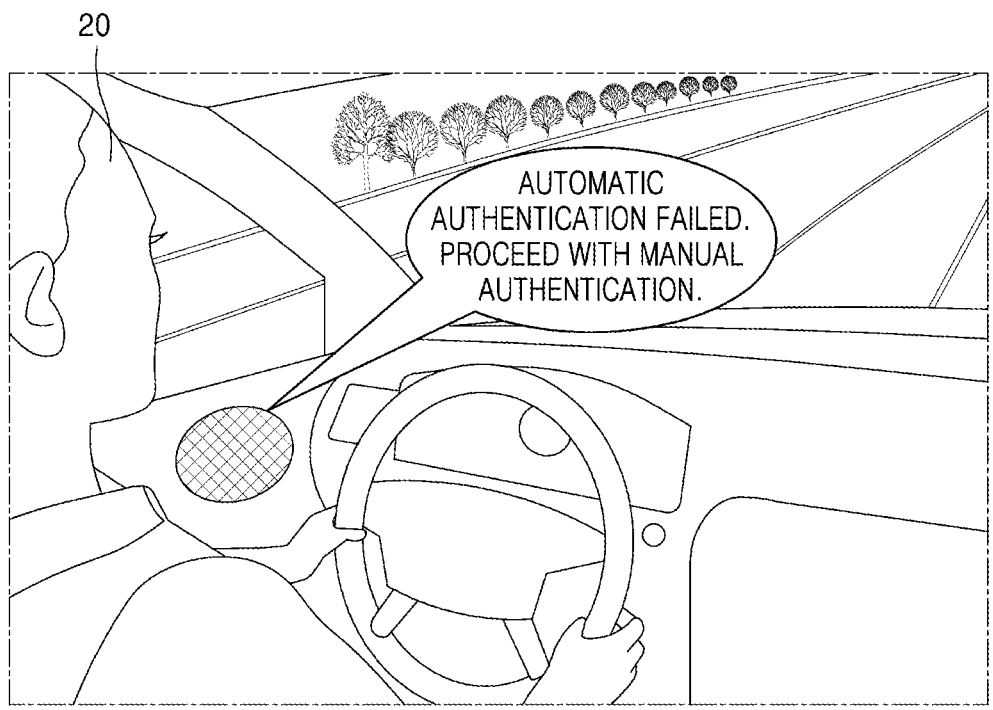
FIG. 3 is a diagram illustrating an example situation in which a message indicating that an artificial intelligence (AI)-based authentication process is switched to another authentication process is output when authentication of a driver fails according to the AI-based authentication process, according to various embodiments.

FIG. 3 is a diagram illustrating an example situation in which a message indicating that an AI-based authentication process is switched to another authentication process is output when authentication of a driver 20 fails according to the AI-based authentication process, according to various embodiments.

The driver 20 is authenticated according to the AI-based authentication process while a vehicle is being driven and, when the authentication of the driver 20 fails, the electronic device 100 may output a message indicating that manual authentication is required due to the failure of automatic authentication according to the AI-based authentication process. The message may be displayed on a display of a vehicle terminal, or output as voice through a speaker.

Due to the message output from the vehicle terminal, the driver 20 may notice that an action for manual authentication is required.

A low-speed authentication process will now be described with reference to FIGS. 4 to 7.

FIGS. 4, 5, 6 and 7 are diagrams illustrating an example driver authentication method based on a low-speed authentication process, according to various embodiments.

As described above, the low-speed authentication process may be performed to authenticate the driver 20 before an AI-based authentication process, or when authentication of the driver 20 fails according to the AI-based authentication process.

Figure 4:
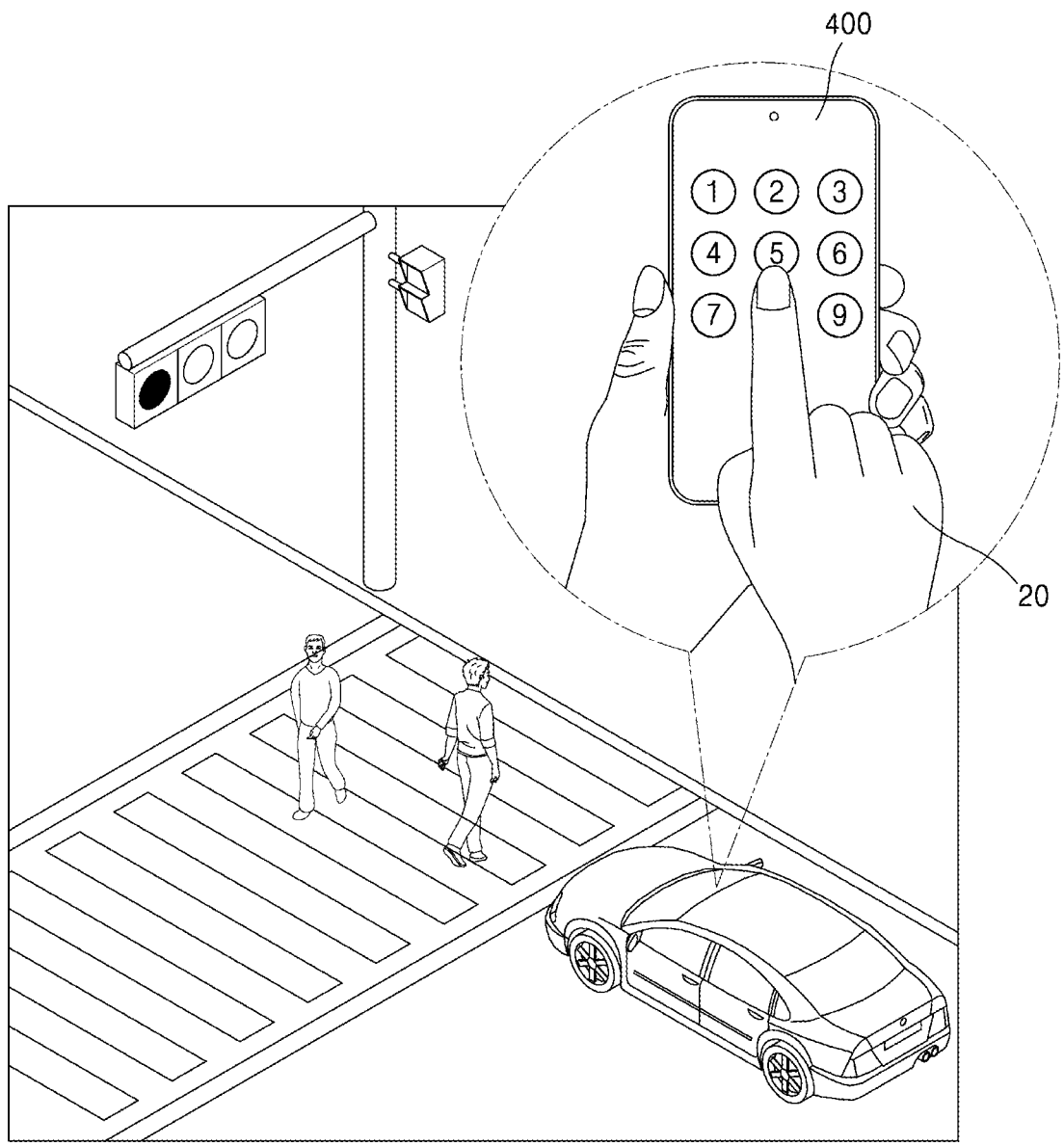
FIG. 4 is a diagram illustrating an example driver authentication method based on a low-speed authentication process, according to various embodiments.

Referring to FIG. 4, the driver 20 may input a password to a mobile device 400, and the second authentication module 150 may determine whether the driver 20 corresponds to a valid user, based on whether the password input by the driver 20 matches a prestored password.

When a different password is stored for each valid user, the second authentication module 150 may determine which valid user the driver 20 corresponds to from among a plurality of valid users, by comparing the password input by the driver 20 to a plurality of prestored passwords.

Figure 5:
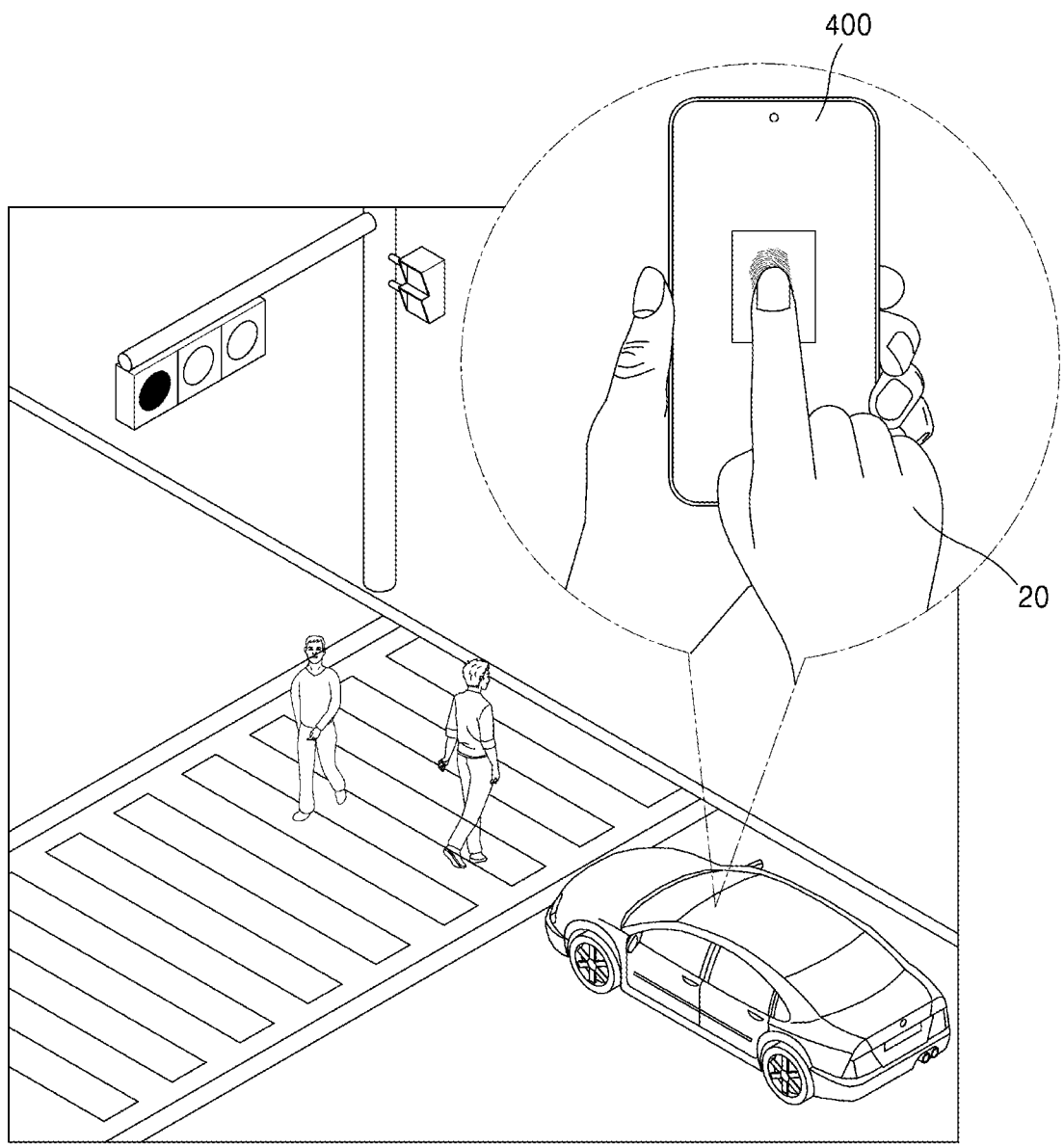
FIG. 5 is a diagram illustrating an example driver authentication method based on a low-speed authentication process, according to various embodiments.

Referring to FIG. 5, the driver 20 may input biometric data to the mobile device 400, and the second authentication module 150 may determine whether the driver 20 corresponds to a valid user, based on whether the biometric data input by the driver 20 matches prestored biometric data. The biometric data may include physical data for distinguishing a person from others, e.g., fingerprint, iris, face, or voice data.

When different biometric data is stored for each valid user, the second authentication module 150 may determine which valid user the driver 20 corresponds to from among a plurality of valid users, by comparing the biometric data input by the driver 20 to a plurality of pieces of biometric data.

Figure 6:
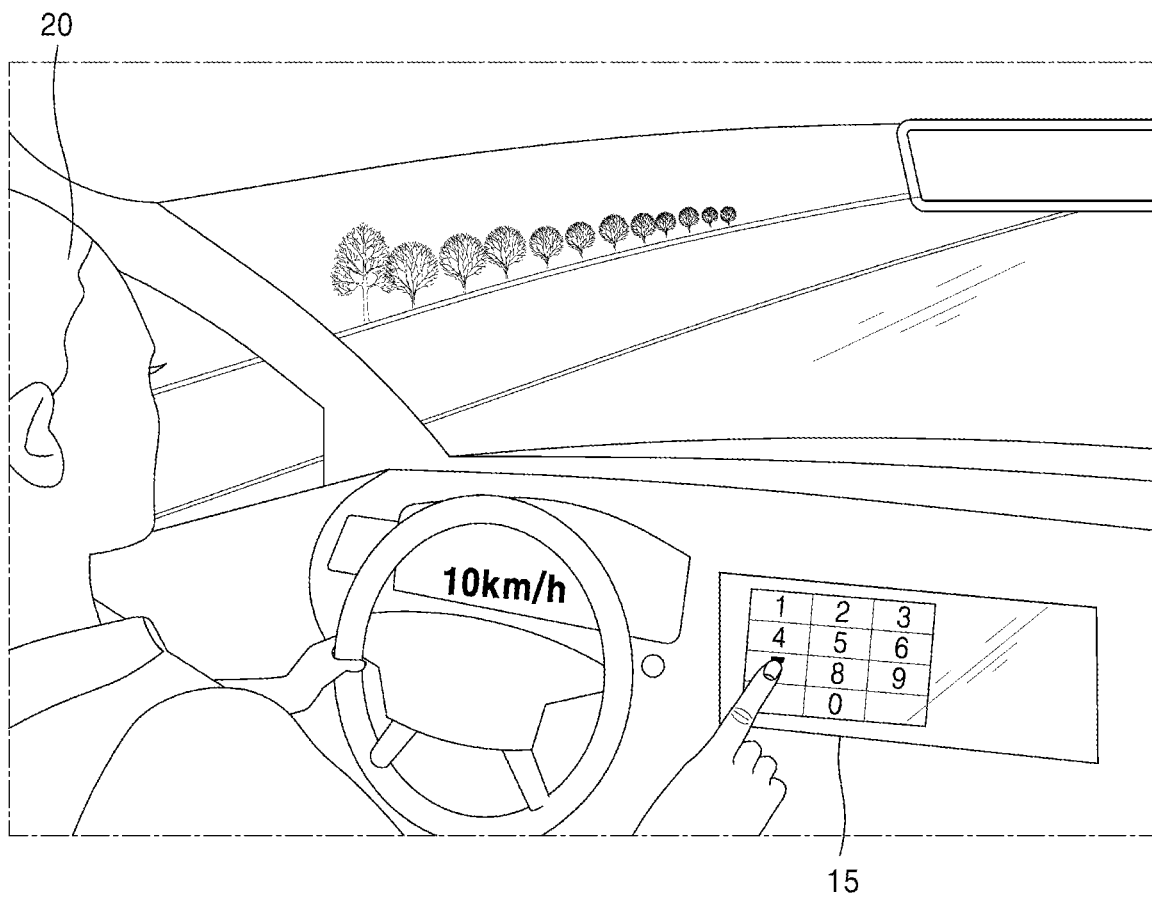
FIG. 6 is a diagram illustrating an example driver authentication method based on a low-speed authentication process, according to various embodiments.

Referring to FIG. 6, the driver 20 may input a password to a vehicle terminal 15. The second authentication module 150 may determine whether the driver 20 corresponds to a valid user, based on whether the password input by the driver 20 matches a prestored password.

When a different password is stored for each valid user, the second authentication module 150 may determine which valid user the driver 20 corresponds to from among a plurality of valid users, by comparing the password input by the driver 20 to a plurality of prestored passwords.

Figure 7:
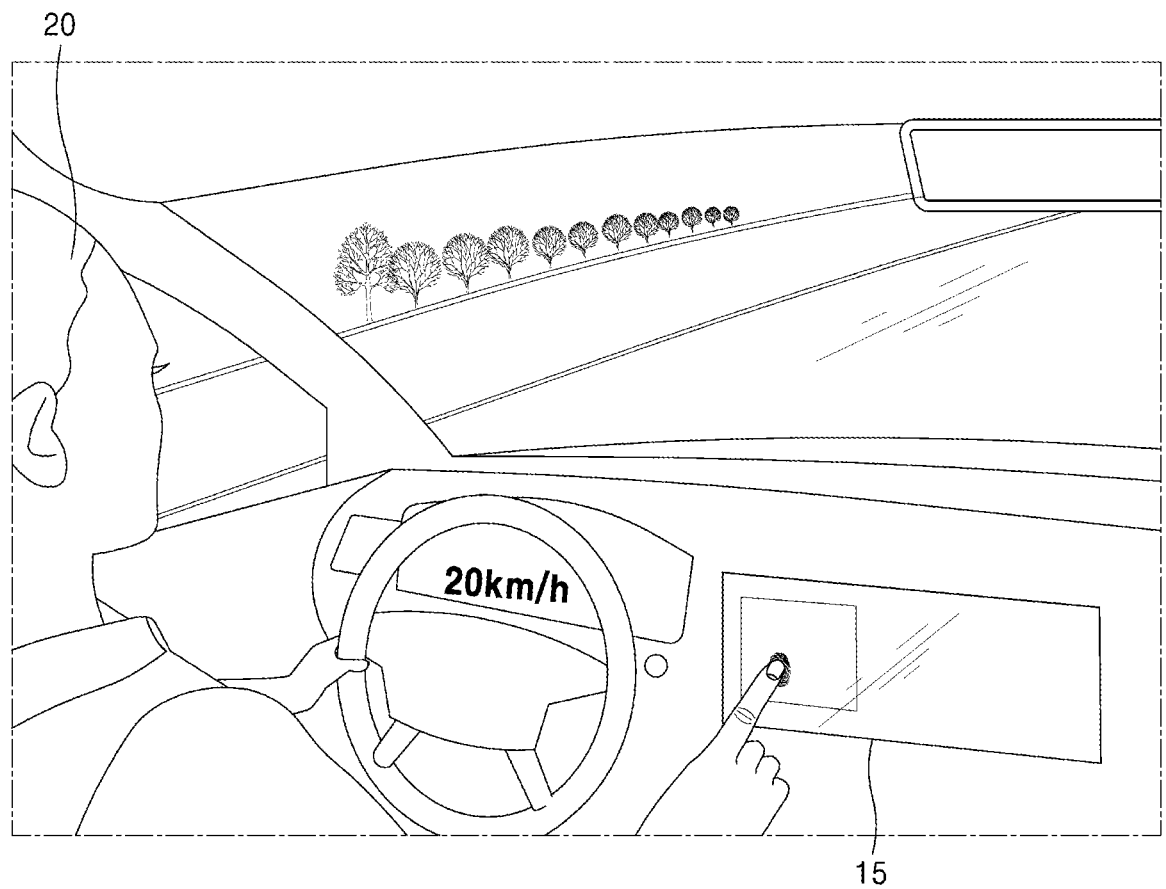
FIG. 7 is a diagram illustrating an example driver authentication method based on a low-speed authentication process, according to various embodiments

Referring to FIG. 7, the driver 20 may input biometric data to the vehicle terminal 15. The second authentication module 150 may determine whether the driver 20 corresponds to a valid user, based on whether the biometric data input by the driver 20 matches prestored biometric data.

When different biometric data is stored for each valid user, the second authentication module 150 may determine which valid user the driver 20 corresponds to from among a plurality of valid users, by comparing the biometric data input by the driver 20 to a plurality of pieces of biometric data.

In an embodiment of the disclosure, when a speed of a vehicle is lower than a critical speed, the second authentication module 150 may authenticate the driver 20 according to any one of the authentication processes shown in FIGS. 4 to 7.

According to an embodiment of the disclosure, the low-speed authentication process may be divided into a plurality of processes based on the speed of the vehicle.

Generally, in a process of authenticating the driver 20, using the mobile device 400 requires a wider range of body motion of the driver 20 than using the vehicle terminal 15, and inputting several characters of a password one by one is more complicated than inputting biometric data once.

Therefore, for example, when the speed of the vehicle is lower than a first critical speed, the driver 20 may be authenticated based on the password input to the mobile device 400 according to the authentication process shown in FIG. 4 or, when the speed of the vehicle is higher than or equal to the first critical speed and is lower than a second critical speed, the driver 20 may be authenticated based on the biometric data input to the mobile device 400 according to the authentication process shown in FIG. 5. When the speed of the vehicle is higher than or equal to the second critical speed and is lower than a third critical speed, the driver 20 may be authenticated based on the password input to the vehicle terminal 15 according to the authentication process shown in FIG. 6 or, when the speed of the vehicle is higher than or equal to the third critical speed and is lower than a fourth critical speed, the driver 20 may be authenticated based on the biometric data input to the vehicle terminal 15 according to the authentication process shown in FIG. 7.

By subdividing the low-speed authentication process based on the speed of the vehicle, the driver 20 may be safely authenticated in consideration of a state of driving.

A high-speed authentication process will now be described in greater detail below with reference to FIGS. 8 and 9.

Figure 8:
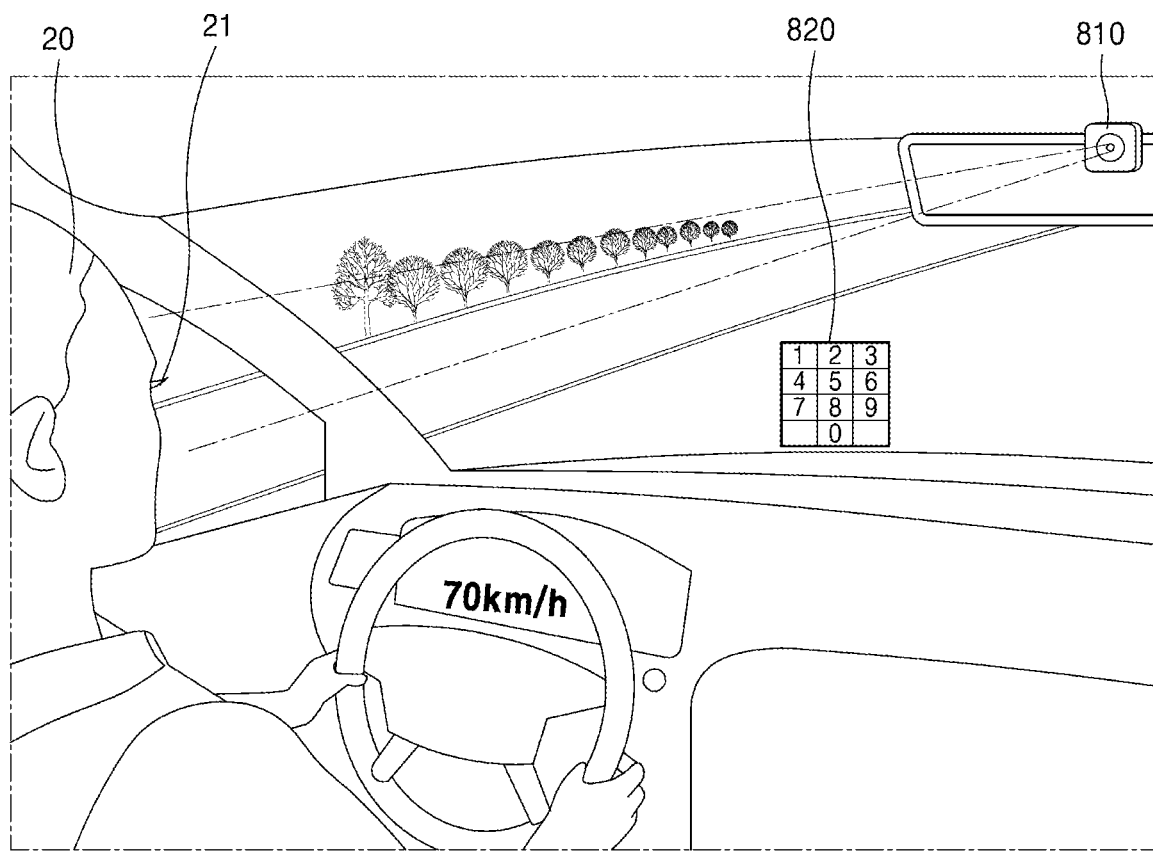
FIG. 8 is a diagram illustrating an example driver authentication method based on a high-speed authentication process, according to various embodiments.
Figure 9:
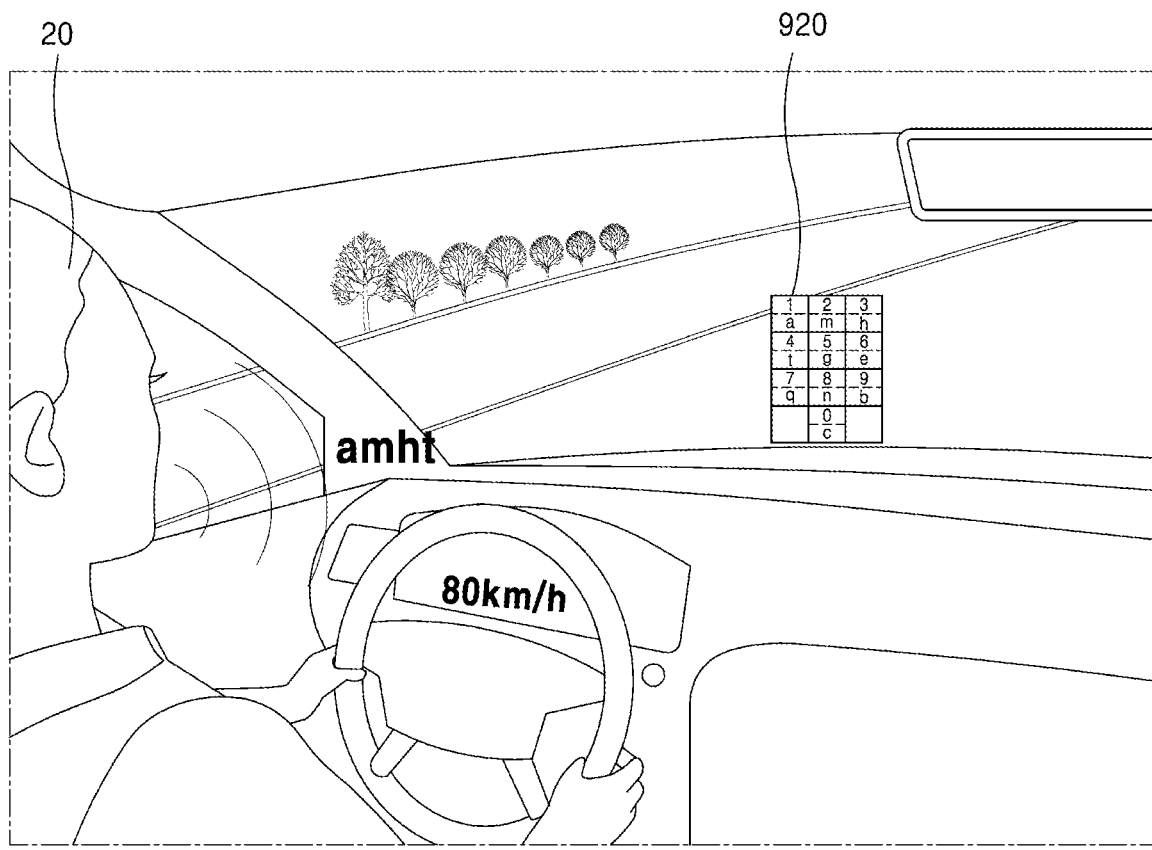
FIG. 9 is a diagram illustrating an example driver authentication method based on a high-speed authentication process, according to various embodiments.

FIGS. 8 and 9 are diagrams illustrating an example driver authentication method based on a high-speed authentication process, according to various embodiments.

As described above, the high-speed authentication process may be performed when authentication of the driver 20 fails according to an AI-based authentication process.

Referring to FIG. 8, in the high-speed authentication process, a symbol pad 820 may be displayed on a head-up display of a vehicle. In an embodiment of the disclosure, the symbol pad 820 may be displayed on a display of a vehicle terminal.

The symbol pad 820 may include a plurality of symbols provided at different locations, and the plurality of symbols may include numbers and/or letters.

The driver 20 may input a password by sequentially gazing at symbols in the symbol pad 820 with eyes 21. A camera 810 in the vehicle may capture an image of the eyes 21 of the driver 20, and the second authentication module 150 may identify the symbols that the eyes 21 gaze at, by tracking the eyes 21 of the driver 20 on the image of the eyes 21.

As an example, the driver 20 may input a specific symbol in the symbol pad 820 by gazing at the symbol with the eyes 21 and then blinking the eyes 21. The camera-based eye tracking technology is being used in the fields of games, marketing, autonomous driving, etc., and thus a detailed description thereof is not provided herein.

The second authentication module 150 may determine whether the driver 20 corresponds to a valid user, based on whether the password input by the driver 20 with the eyes 21 matches a prestored password.

When a different password is stored for each valid user, the second authentication module 150 may determine which valid user the driver 20 corresponds to from among a plurality of valid users, by comparing the password input by the driver 20 to a plurality of prestored passwords.

According to the high-speed authentication process shown in FIG. 8, the driver 20 may input the password only with the eyes 21 without any motion of a body part such as an arm or a hand, and thus be safely authenticated during high-speed driving.

Referring to FIG. 9, the driver 20 may utter a temporary password including temporary symbols allocated to symbols of a password that the driver 20 desires to input.

A symbol pad 920 may be displayed on a head-up display and/or a display of a vehicle terminal, and temporary symbols may be allocated to a plurality of symbols included in the symbol pad 920.

FIG. 9 shows an example in which alphabets are allocated as temporary symbols to numbers included in the symbol pad 920.

The driver 20 may utter, instead of a password, a temporary password corresponding to the password, and the second authentication module 150 may identify the temporary password uttered by the driver 20 through a voice recognition algorithm, and determine a password that the driver 20 desires to input, based on the identified temporary password.

For example, as shown in FIG. 9, when the driver 20 utters 'amht', the second authentication module 150 may determine that the driver 20 inputs '1234' as a password.

The second authentication module 150 may determine whether the driver 20 corresponds to a valid user, based on whether the password corresponding to the temporary password uttered by the driver 20 matches a prestored password.

When a different password is stored for each valid user, the second authentication module 150 may determine which valid user the driver 20 corresponds to from among a plurality of valid users, by comparing a password corresponding to the temporary password uttered by the driver 20 to a plurality of prestored passwords.

According to the authentication process shown in FIG. 8, driving may be disturbed because the driver 20 needs to continuously gaze at specific symbols in the symbol pad 820 to input a password, and an error may occur due to a low accuracy of the eye tracking algorithm. According to the authentication process shown in FIG. 9, leakage of a password to a third party may be prevented/reduced by uttering a temporary password, and an accident caused when the driver 20 does not look ahead may also be prevented/reduced.

In an embodiment of the disclosure, when a speed of a vehicle is higher than or equal to a critical speed, the second authentication module 150 may authenticate the driver 20 according to any one of the authentication processes shown in FIGS. 8 and 9.

In an embodiment of the disclosure, the high-speed authentication process may be divided into a plurality of processes based on the speed of the vehicle.

In consideration of (e.g., based on) the risk of the driver 20 continuously gazing at a specific symbol according to the authentication process shown in FIG. 8, for example, when the speed of the vehicle is lower than a first critical speed, the driver 20 may be authenticated according to the authentication process shown in FIG. 8 or, when the speed of the vehicle is higher than or equal to the first critical speed and is lower than a second critical speed, the driver 20 may be authenticated according to the authentication process shown in FIG. 9. Herein, to authenticate the driver 20 according to the authentication process shown in FIG. 8 or the authentication process shown in FIG. 9, it is noted that the speed of the vehicle should not be a speed for a low-speed authentication process (e.g., the speed of the vehicle needs to be higher than or equal to a critical speed for defining the low-speed authentication process and the high-speed authentication process).

Figure 10:
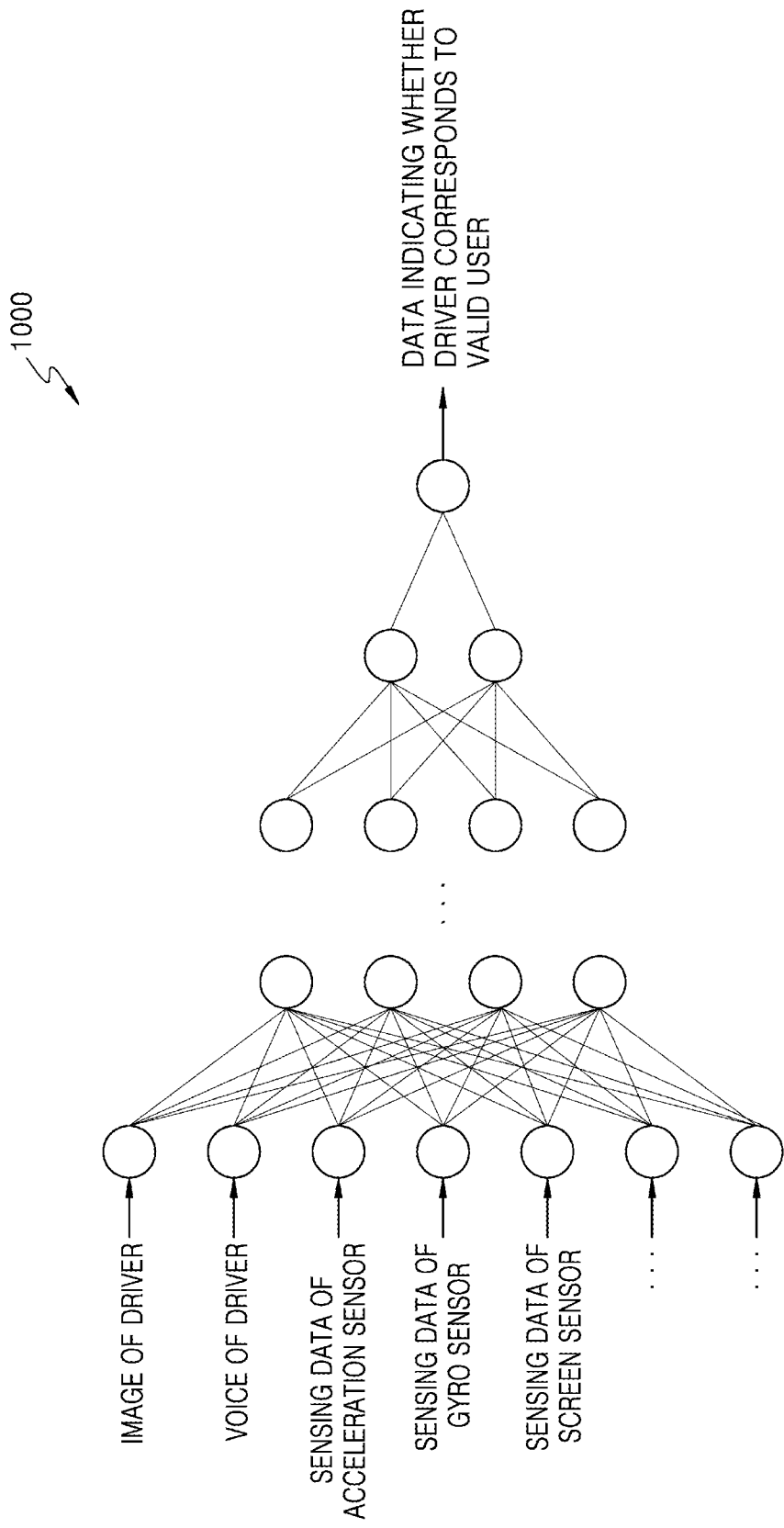
FIG. 10 is a diagram illustrating an example architecture of a neural network used in an AI-based authentication process, according to various embodiments

FIG. 10 is a diagram illustrating an example architecture of a neural network 1000 used in an AI-based authentication process, according to various embodiments.

The neural network 1000 may be stored in the memory 170. In an embodiment of the disclosure, the neural network 1000 may also be implemented as at least one dedicated processor for AI.

The neural network 1000 used in the AI-based authentication process may be implemented as a fully connected layer (FCL).

The FCL may include at least one node, and refer to a neural network configured to process data input to nodes according to parameters and transmit the processed data to nodes of a subsequent layer. Each node included in the FCL may be connected to nodes included in a previous layer or a subsequent layer.

The neural network 1000 may output data indicating whether a driver corresponds to a valid user, by processing sensing data obtained by a sensor of a mobile device and/or a vehicle.

As shown in FIG. 10, the neural network 1000 may receive at least one of an image of the driver, voice of the driver, sensing data of an acceleration sensor, sensing data of a gyro sensor, sensing data of a screen sensor, or biometric data of the driver (e.g., data indicating an ECG, a PPG, or a blood pressure), and process the sensing data according to parameters set through training.

In an embodiment of the disclosure, as a result of processing the sensing data, the neural network 1000 may output data indicating whether the driver corresponds to a valid user.

For example, the neural network 1000 may output a probability value that the driver corresponds to a valid user. In this case, the first authentication module 130 may determine that the driver corresponds to a valid user, when the probability value output from the neural network 1000 is greater than or equal to a preset value, or determine that the driver does not correspond to a valid user, when the probability value output from the neural network 1000 is less than the preset value.

The FCL illustrated in FIG. 10 shows an architecture of the neural network 1000 according to an example embodiment of the disclosure and, in an example embodiment of the disclosure, the neural network 1000 may also be implemented as a convolutional neural network (CNN), a recurrent neural network (RNN), or the like.

Because the sensing data obtained by the sensor represents the appearance, voice, biometric features, mobile device usage habits, or vehicle driving habits of the driver, the neural network 1000 pre-trained based on sensing data of a valid user may determine whether the driver corresponds to a valid user.

For example, the neural network 1000 trained based on the sensing data of the valid user may determine whether the driver corresponds to a valid user, by determining similarity between sensing data obtained while the driver is driving the vehicle and the sensing data used for training.

Although each driver has a different appearance, voice, biometric features, mobile device usage habits, and vehicle driving habits, some sensing data (e.g., the voice and the sensing data of the screen sensor of the mobile device) may not be collected while the driver is driving. Therefore, in the disclosure, using sensing data obtained from various types of sensors together to authenticate the driver, accuracy of driver authentication may be ensured. For example, when the voice of the driver and the sensing data of the screen sensor are not collected, the neural network 1000 may determine whether the driver corresponds to a valid user, based on the image of the driver, the sensing data of the acceleration sensor, and the sensing data of the gyro sensor.

In an embodiment of the disclosure, the neural network 1000 may be trained based on sensing data of a plurality of valid users. In this case, the neural network 1000 may output data indicating which valid user the driver corresponds to from among the plurality of valid users, or probability values that the driver corresponds to the plurality of valid users, by processing the sensing data of the driver.

In an embodiment of the disclosure, the neural network 1000 illustrated in FIG. 10 may be stored in a mobile device and/or a server in a distributed manner. In this case, the communication module 190 may transmit the sensing data collected by the sensor of the vehicle to the mobile device and/or the server, and receive output data of the neural network 1000 from the mobile device and/or the server. The first authentication module 130 may determine whether the driver corresponds to a valid user, based on the output data of the neural network 1000 received by the communication module 190.

A method of training the neural network 1000 will now be described in greater detail below with reference to FIG. 11.

The neural network 1000 may be trained based on sensing data of a valid user. A parameter set settable for the neural network 1000 may be obtained through training. The parameter set may refer, for example, to a set or group of parameters used to process sensing data.

Figure 11:
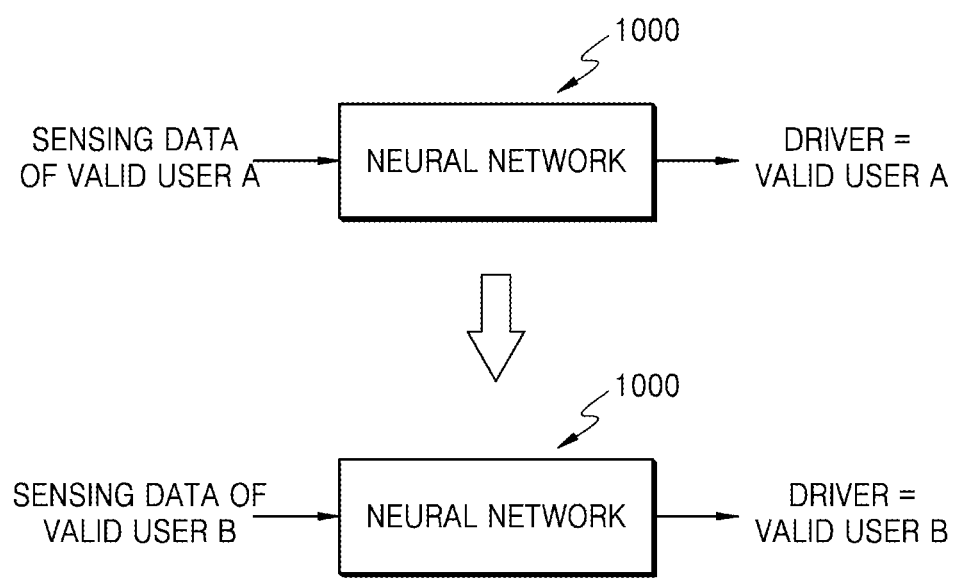
FIG. 11 is a diagram illustrating an example method of training a neural network used in an AI-based authentication process, according to various embodiments.

As shown in FIG. 11, for example, when sensing data of a valid user A is used to train the neural network 1000, the neural network 1000 need to output data indicating that a driver is the valid user A, by processing the sensing data of the valid user A. The first authentication module 130 may update initial parameters of the neural network 1000 in such a manner that the neural network 1000 may output the data indicating that the driver is the valid user A, by processing the sensing data of the valid user A.

When the training of the neural network 1000 based on the sensing data of the valid user A is completed, a parameter set corresponding to the valid user A may be obtained. As described in greater detail below with reference to FIG. 17, the parameter set corresponding to the valid user A may be separately stored in the memory 170. The parameter set corresponding to the valid user A may be used to determine whether the driver corresponds to the valid user A.

The neural network 1000 may need to be trained based on sensing data of a valid user B, the first authentication module 130 may update the initial parameters of the neural network 1000 in such a manner that the neural network 1000 may output the data indicating that the driver is the valid user B, by processing the sensing data of the valid user B.

When the training of the neural network 1000 based on the sensing data of the valid user B is completed, a parameter set corresponding to the valid user B may be obtained. The parameter set corresponding to the valid user B may be separately stored in the memory 170. The parameter set corresponding to the valid user B may be used to determine whether the driver corresponds to the valid user B.

In an embodiment of the disclosure, the neural network 1000 may be trained sequentially based on the sensing data of the valid user A and the sensing data of the valid user B. In other words, the parameters of the neural network 1000 may be repeatedly updated while processing the sensing data of the valid user A and the sensing data of the valid user B. In this case, the parameter set obtained through training is not limited to any one valid user, and may be used to determine which valid user the driver corresponds to from among a plurality of valid users. For example, when the neural network 1000 is trained based on the sensing data of the valid user A and the sensing data of the valid user B, the neural network 1000 may output data indicating which valid user the driver corresponds to from among the valid users A and B, or data indicating that the driver does not correspond to any valid user.

The neural network 1000 used in the AI-based authentication process may include a plurality of sub-neural networks configured to process different types of sensing data, and a description thereof will now be provided in greater detail below with reference to FIGS. 12, 13, 14, 15 and 16.

Figure 12:
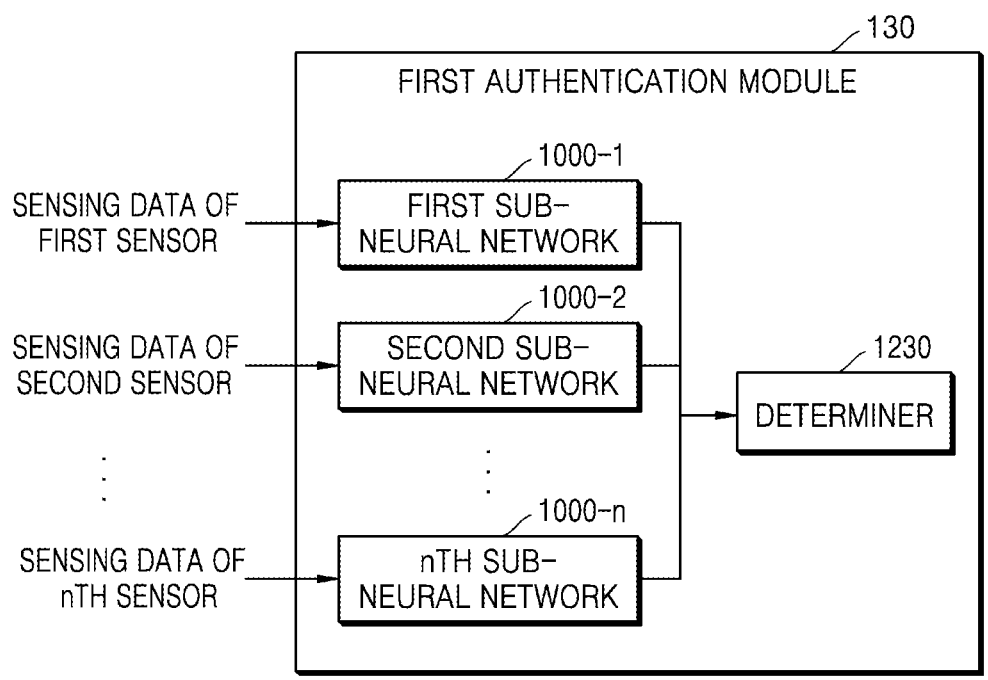
FIG. 12 is a block diagram illustrating an example configuration of a first authentication module according to various embodiments.

FIG. 12 is a block diagram illustrating an example configuration of the first authentication module 130 according to various embodiments.

The first authentication module 130 may include a plurality of sub-neural networks 1000-1, 1000-2, . . . , and 1000-n and a determiner (e.g., including various processing circuitry and/or executable program instructions) 1230.

The plurality of sub-neural networks 1000-1, 1000-2, . . . , and 1000-n may be stored in the memory 170. In an embodiment of the disclosure, the plurality of sub-neural networks 1000-1, 1000-2, . . . , and 1000-n may also be implemented as at least one dedicated processor for AI.

The first sub-neural network 1000-1 may receive sensing data of a first sensor, the second sub-neural network 1000-2 may receive sensing data of a second sensor, and the nth sub-neural network 1000-n may receive sensing data of an nth sensor. For example, when the sensing data of the first sensor is sensing data of an acceleration sensor, the sensing data of the second sensor may be sensing data of a screen sensor, and the sensing data of the nth sensor may be voice data.

When sensing data obtained by a sensor of a mobile device is used in an AI-based authentication process, the communication module 190 may receive the sensing data from the mobile device, and the first authentication module 130 may apply, to the plurality of sub-neural networks 1000-1, 1000-2, . . . , and 1000-n, sensing data obtained by a sensor of a vehicle and the sensing data obtained by the sensor of the mobile device.

In an embodiment of the disclosure, sensing data obtained by the same type of sensors may be input to any one sub-neural network. For example, sensing data of an acceleration sensor of the mobile device and sensing data of an acceleration sensor of the vehicle may be processed by the first sub-neural network 1000-1, and sensing data of a gyro sensor of the mobile device and sensing data of a gyro sensor of the vehicle may be processed by the second sub-neural network 1000-2.

In an embodiment of the disclosure, the first authentication module 130 may regard the sensing data obtained by the sensor of the mobile device and the sensing data obtained by the sensor of the vehicle as heterogeneous data, and process the same with different sub-neural networks. For example, the sensing data of the acceleration sensor of the mobile device may be processed by the first sub-neural network 1000-1, and the sensing data of the acceleration sensor of the vehicle may be processed by the second sub-neural network 1000-2.

Each of the plurality of sub-neural networks 1000-1, 1000-2, . . . , and 1000-n may output data indicating whether a driver corresponds to a valid user, by processing the sensing data.

The determiner 1230 may ultimately determine whether the driver corresponds to a valid user, by combining the data output from the plurality of sub-neural networks 1000-1, 1000-2, . . . , and 1000-n.

The data output from the sub-neural networks 1000-1, 1000-2, . . . , and 1000-n may vary depending on a method of training the sub-neural networks 1000-1, 1000-2, . . . , and 1000-n.

As an example, when the sub-neural networks 1000-1, 1000-2, . . . , and 1000-n are trained based on sensing data of any one valid user, the sub-neural networks 1000-1, 1000-2, . . . , and 1000-n may output data indicating that the driver corresponds or does not correspond to a valid user (e.g., Y/N). In this case, when a number of sub-neural networks greater than or equal to a predetermined number from among the plurality of sub-neural networks 1000-1, 1000-2, . . . , and 1000-n determine that the driver corresponds to a valid user, the determiner 1230 may ultimately determine that the driver is a valid user. When only a number of sub-neural networks less than the predetermined number from among the plurality of sub-neural networks 1000-1, 1000-2, . . . , and 1000-n determine that the driver corresponds to a valid user, the determiner 1230 may ultimately determine that the driver is not a valid user.

As another example, when the sub-neural networks 1000-1, 1000-2, . . . , and 1000-n are trained based on sensing data of any one valid user, the sub-neural networks 1000-1, 1000-2, . . . , and 1000-n may output a probability value that the driver corresponds to a valid user. When the number of sub-neural networks which output a probability value (e.g., a probability value that the driver corresponds to a valid user) greater than or equal to a preset value is greater than or equal to a predetermined number, the determiner 1230 may ultimately determine that the driver is a valid user. When the number of sub-neural networks which output a probability value greater than or equal to the preset value is less than the predetermined number, the determiner 1230 may ultimately determine that the driver is not a valid user.

Figure 13:
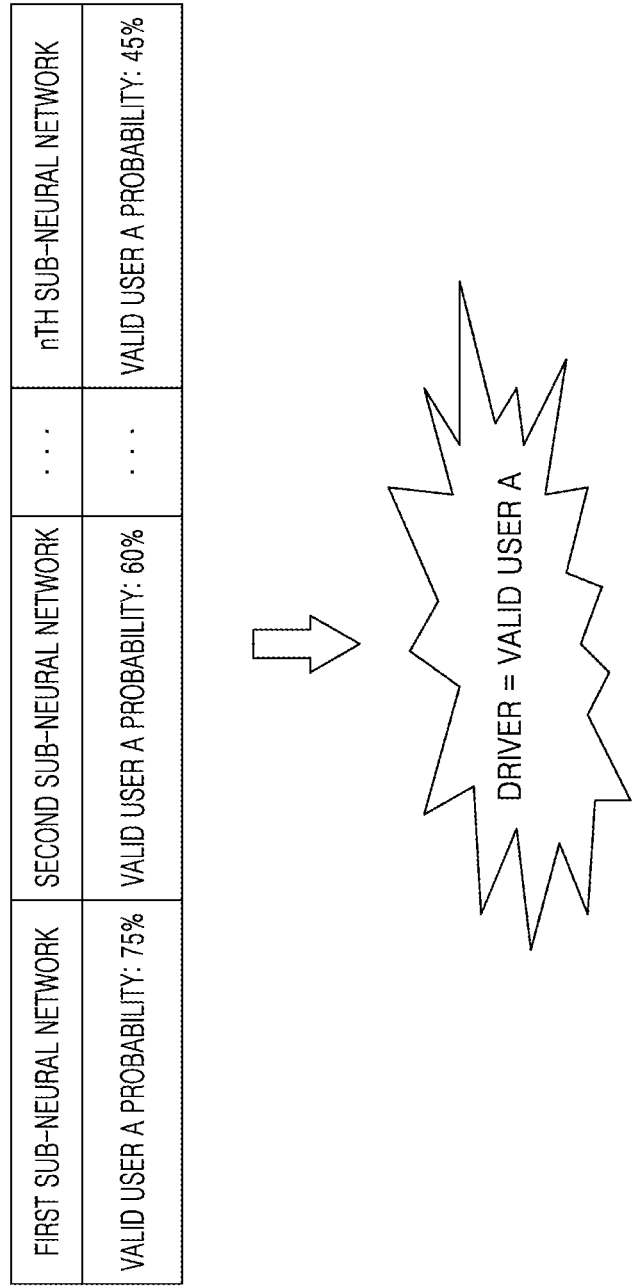
FIG. 13 is a diagram illustrating an example process of determining that a driver corresponds to a valid user A, based on output results of a plurality of sub-neural networks according to various embodiments.

For example, when the predetermined number is 2 and the preset value is 50%, as shown in FIG. 13, because the first sub-neural network 1000-1 and the second sub-neural network 1000-2 respectively output 75% and 60% as probability values that the driver corresponds to the valid user A, the determiner 1230 may ultimately determine that the driver is the valid user A.

As another example, when the sub-neural networks 1000-1, 1000-2, . . . , and **1000-*n* are trained based on sensing data of a plurality of valid users, the sub-neural networks 1000-1, 1000-2, . . . , and 1000-*n* may output data indicating which valid user the driver corresponds to from among the plurality of valid users, or data indicating that the driver does not correspond to any valid user. When a number of sub-neural networks greater than or equal to a predetermined number from among the plurality of sub-neural networks 1000-1, 1000-2, . . . , and 1000-*n* determine that the driver corresponds to a specific valid user, the determiner 1230 may ultimately determine that the driver is the specific valid user. When the number of sub-neural networks which determine that the driver is the specific valid user is less than the predetermined number, the determiner 1230** may ultimately determine that the driver is not a valid user.

As another example, when the sub-neural networks 1000-1, 1000-2, . . . , and **1000-*n* are trained based on sensing data of a plurality of valid users, the sub-neural networks 1000-1, 1000-2, . . . , and 1000-*n* may output probability values that the driver corresponds to the plurality of valid users. When the number of sub-neural networks which output a value greater than or equal to a preset value as a probability value that the driver corresponds to a specific valid user is greater than or equal to a predetermined number, the determiner 1230 may ultimately determine that the driver is the specific valid user. When the number of sub-neural networks which output a value greater than or equal to the preset value as a probability value that the driver corresponds to the specific valid user is less than the predetermined number, the determiner 1230** may ultimately determine that the driver is not a valid user.

Figure 14:
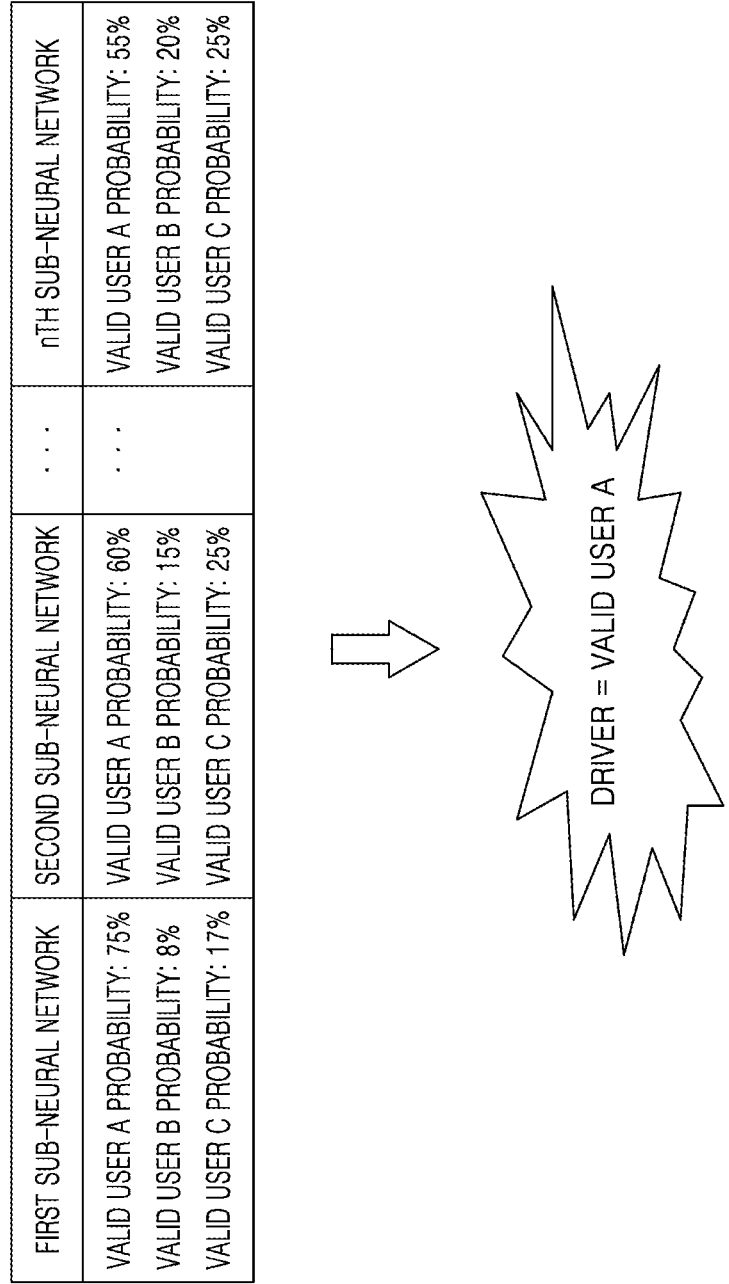
FIG. 14 is a diagram illustrating an example process of determining that a driver corresponds to a valid user A, based on output results of a plurality of sub-neural networks according to various embodiments.
Figure 15:
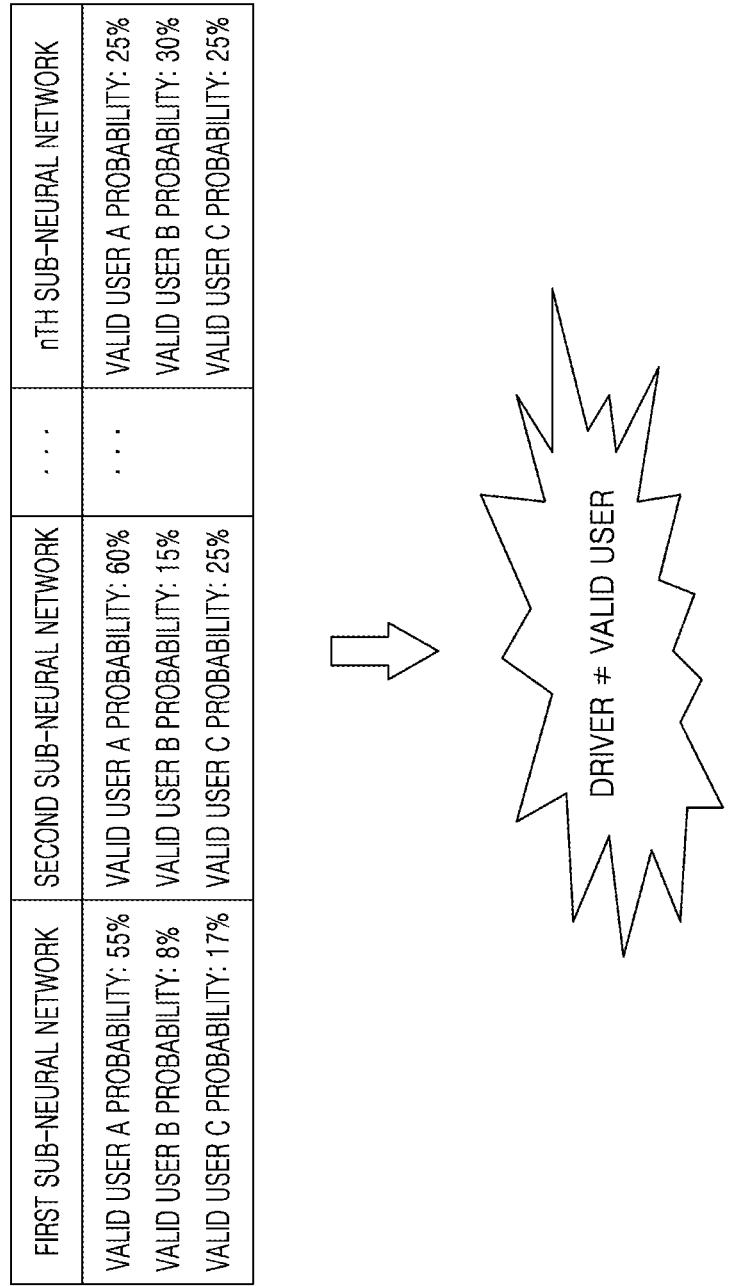
FIG. 15 is a diagram illustrating an example process of determining that a driver does not correspond to a valid user, based on output results of a plurality of sub-neural networks according to various embodiments.

For example, when the predetermined number is 3 and the preset value is 50%, as shown in FIG. 14, because the first sub-neural network 1000-1, the second sub-neural network 1000-2, and the nth sub-neural network **1000-*n* respectively output 75%, 60%, and 55% as probability values that the driver corresponds to the valid user A, the determiner 1230 may ultimately determine that the driver is the valid user A. Alternatively, as shown in FIG. 15, because only the first sub-neural network 1000-1 and the second sub-neural network 1000-2 output 55% and 60% as probability values that the driver corresponds to the valid user A, and the other probability values are less than 50%, the determiner 1230** may determine that the driver does not correspond to any valid user.

Figure 16:
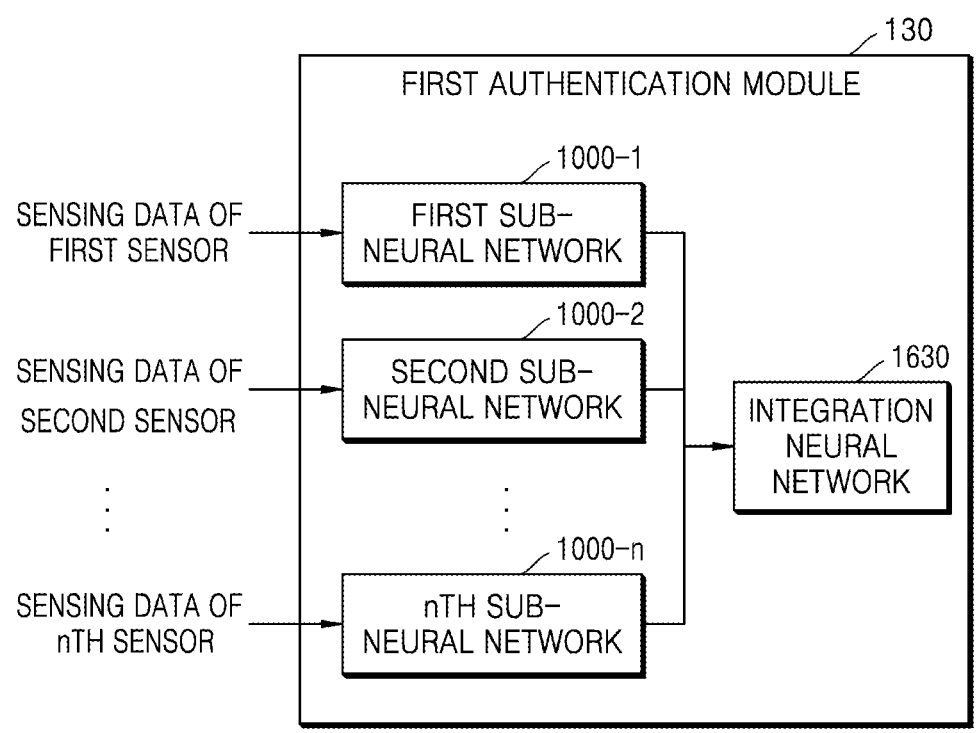
FIG. 16 is a block diagram illustrating an example configuration of a first authentication module according to various embodiments.

FIG. 16 is a block diagram illustrating an example configuration of the first authentication module 130 according to various embodiments.

The first authentication module 130 may use the plurality of sub-neural networks 1000-1, 1000-2, . . . , and **1000-*n* and an integration neural network 1630** for an AI-based authentication process.

The plurality of sub-neural networks 1000-1, 1000-2, . . . , and **1000-*n* and the integration neural network 1630 may be stored in the memory 170. In an embodiment of the disclosure, the plurality of sub-neural networks 1000-1, 1000-2, . . . , and 1000-*n* and the integration neural network 1630** may also be implemented as at least one dedicated processor for AI.

Each of the plurality of sub-neural networks 1000-1, 1000-2, . . . , and **1000-*n*** may output data indicating whether a driver corresponds to a valid user, by processing a different type of sensing data.

In an embodiment of the disclosure, the plurality of sub-neural networks 1000-1, 1000-2, . . . , and **1000-*n*** may output data indicating that the driver corresponds or does not correspond to a valid user (e.g., Y/N).

In an embodiment of the disclosure, the plurality of sub-neural networks 1000-1, 1000-2, . . . , and **1000-*n*** may output a probability value that the driver corresponds to a valid user.

In an embodiment of the disclosure, the plurality of sub-neural networks 1000-1, 1000-2, . . . , and **1000-*n*** may output data indicating which valid user the driver corresponds to from among a plurality of valid users, or data indicating that the driver does not correspond to any valid user.

In an embodiment of the disclosure, the plurality of sub-neural networks 1000-1, 1000-2, . . . , and **1000-*n*** may output probability values that the driver corresponds to the plurality of valid users.

The integration neural network 1630 may output data indicating whether the driver corresponds or does not correspond to a valid user, by processing the data output from the plurality of sub-neural networks 1000-1, 1000-2, . . . , and **1000-*n*** according to parameters set through training.

When the driver corresponds to a valid user, the integration neural network 1630 may also output data indicating which valid user the driver corresponds to from among the plurality of valid users.

In an embodiment of the disclosure, because the plurality of sub-neural networks 1000-1, 1000-2, . . . , and **1000-*n* process different types of sensing data, there may be no consistency between the output data of the plurality of sub-neural networks 1000-1, 1000-2, . . . , and 1000-*n*. For example, the first sub-neural network 1000-1 may output data indicating that the driver corresponds to the valid user A, and the second sub-neural network 1000-2 may output data indicating that the driver corresponds to the valid user B. The integration neural network 1630 ultimately determine whether the driver corresponds to a valid user, by integrating the output data of the plurality of sub-neural networks 1000-1, 1000-2, . . . , and 1000-*n*** in which consistency is not ensured.

Flexible extension of sub-neural networks may be enabled by the integration neural network 1630 which processes the output data of the plurality of sub-neural networks 1000-1, 1000-2, . . . , and **1000-*n*. As such, when an existing sensor is changed to another sensor, although a sub-neural network for processing sensing data of the existing sensor needs to be changed or updated to a sub-neural network for processing sensing data of the other sensor, the number or type of data to be processed by the integration neural network 1630 is not changed and thus additional training of the integration neural network 1630** is not required.

Even when a new sub-neural network is used due to addition of a new sensor, the integration neural network 1630 may merely further process output data of the new sub-neural network.

In other words, using the integration neural network 1630 in the AI-based authentication process, a sensor for authenticating the driver may be easily replaced, added, or removed.

Meanwhile, the AI-based authentication process may be performed after authentication of the driver succeeds according to a low-speed authentication process (see FIG.

2). In this case, a parameter set of a neural network used in the AI-based authentication process may be replaced, and an embodiment of the disclosure related thereto will now be described in greater detail.

FIG. 17 is a diagram illustrating example parameter sets corresponding to a plurality of valid users according to various embodiments.

As described above in relation to FIG. 11, a neural network may be trained independently based on sensing data of a plurality of valid users. Parameter sets corresponding to the plurality of valid users may be stored individually.

Referring to FIG. 17, a first parameter set corresponding to the valid user A, a second parameter set corresponding to the valid user B, and a third parameter set corresponding to a valid user C may be stored in the memory 170.

When it is determined through a low-speed authentication process which valid user a driver corresponds to from among a plurality of valid users, the first authentication module 130 may configure the neural network with a parameter set corresponding to the valid user. When the neural network is configured with the parameter set, it may refer, for example, to the neural network being controlled in such a manner that the neural network may process data according to parameters included in the parameter set.

The neural network configured with a parameter set corresponding to a specific valid user may output data indicating whether the driver corresponds to the specific valid user determined through the low-speed authentication process. For example, when the neural network is configured with the first parameter set corresponding to the valid user A, the neural network may output data indicating whether the driver corresponds to the valid user A.

When at least one of the plurality of sub-neural networks 1000-1, 1000-2, . . . , and 1000-$n$ or the integration neural network 1630 is stored in a mobile device and/or a server in a distributed manner, the electronic device 100 may transmit information about the valid user determined through the low-speed authentication process to the mobile device and/or the server to replace the parameter set of the neural network stored in the mobile device and/or the server, with the parameter set corresponding to the valid user.

An embodiment of the disclosure in which neural networks used in an AI-based authentication process are stored in a distributed manner will now be described in greater detail below with reference to FIGS. 18 and 19.

Figure 18:
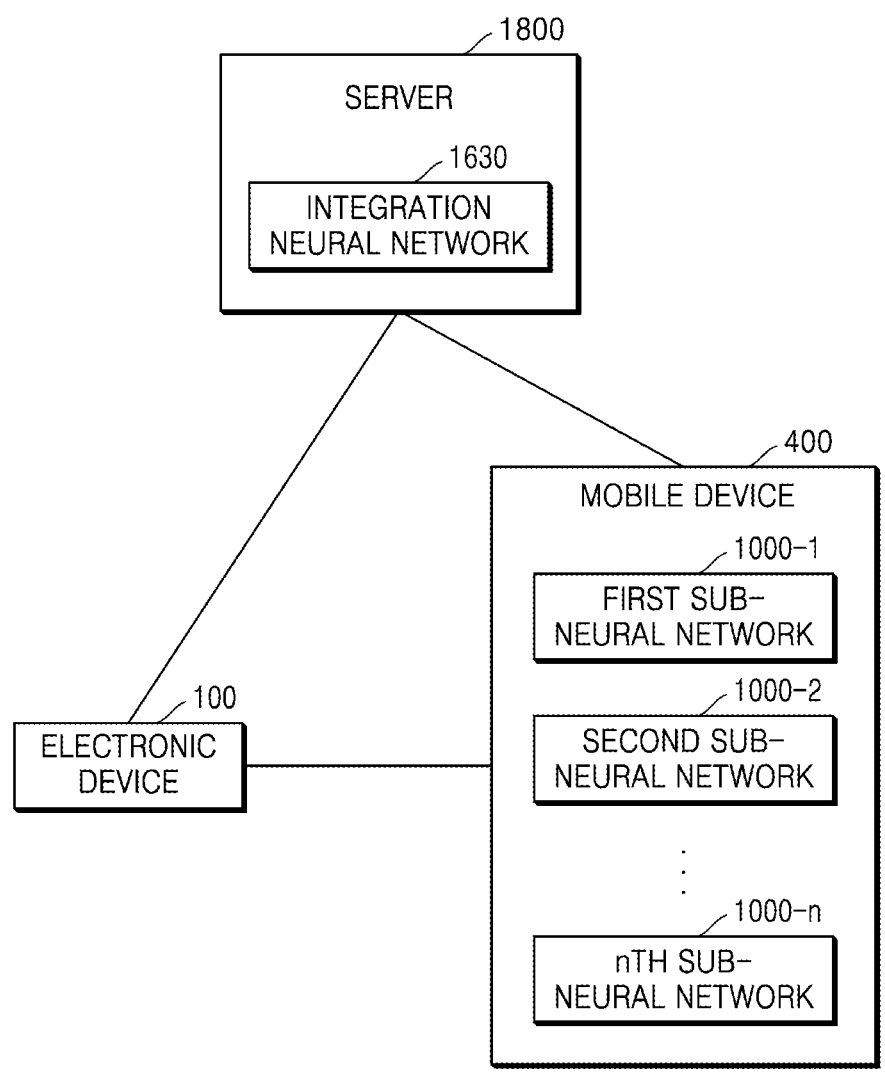
FIG. 18 is a diagram illustrating example neural networks stored in a mobile device and a server in a distributed manner according to various embodiments.
Figure 19:
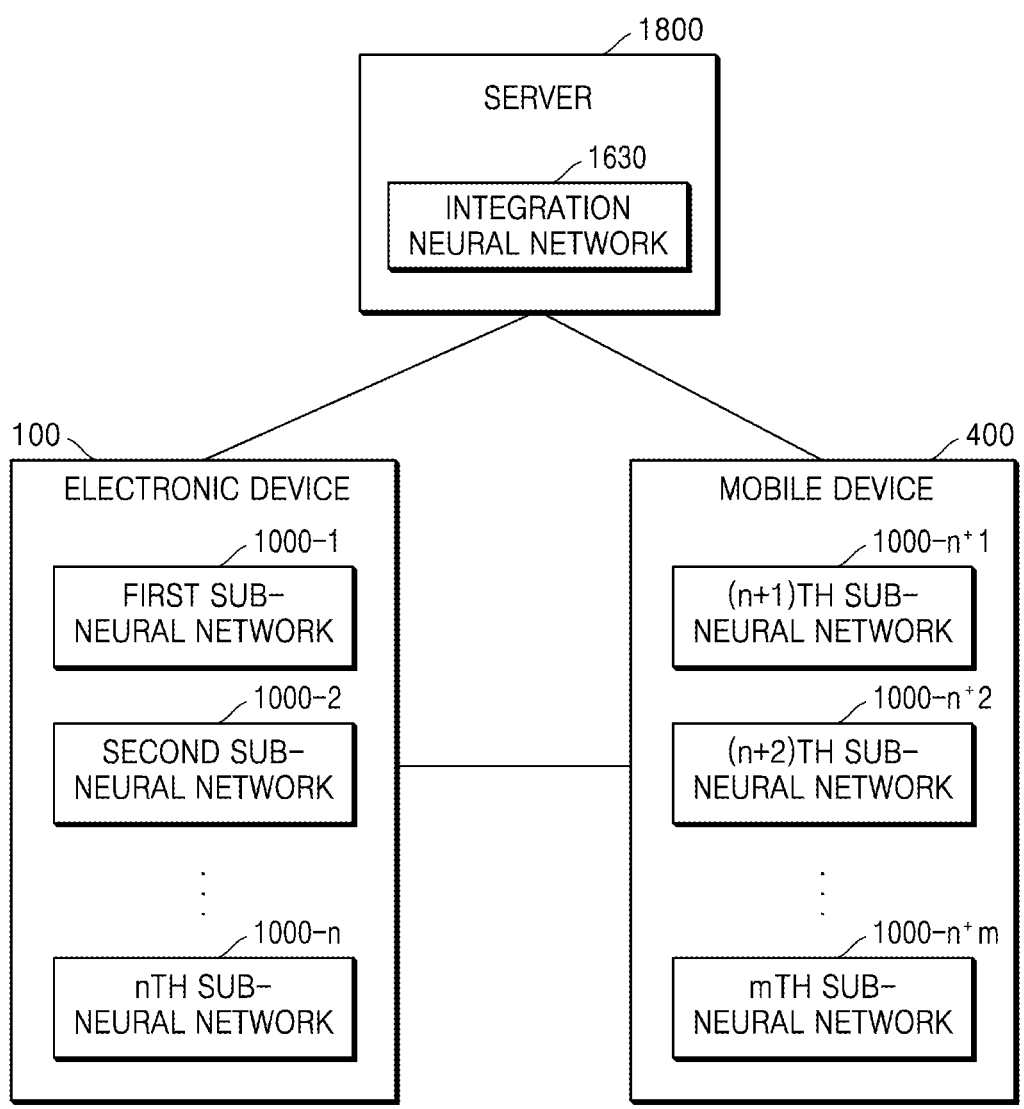
FIG. 19 is a diagram illustrating example neural networks stored in a mobile device and a server in a distributed manner according to various embodiments.

FIGS. 18 and 19 are diagrams illustrating example neural networks stored in a mobile device 400 and a server 1800 in a distributed manner according to various embodiments.

As shown in FIG. 18, the plurality of sub-neural networks 1000-1, 1000-2, . . . , and 1000-$n$ may be stored in the mobile device 400, and the integration neural network 1630 may be stored in the server 1800.

When an AI-based authentication process is required, the electronic device 100 transmits, to the mobile device 400, sensing data obtained by a sensor of a vehicle.

The mobile device 400 applies, to the plurality of sub-neural networks 1000-1, 1000-2, . . . , and 1000-$n$, the sensing data received from the electronic device 100 and sensing data obtained by a sensor of the mobile device 400, and transmits, to the server 1800, data output from the plurality of sub-neural networks 1000-1, 1000-2, . . . , and 1000-$n$.

The server 1800 obtains data indicating whether a driver corresponds to a valid user, by applying the output data received from the mobile device 400, to the integration neural network 1630, and transmits the obtained data to the electronic device 100.

The electronic device 100 or, more specifically, the first authentication module 130 may determine whether the driver corresponds to a valid user, based on the data received from the server 1800.

As described above, when parameter sets corresponding to a plurality of valid users are stored individually, the electronic device 100 may transmit, to the mobile device 400 and the server 1800, information indicating which valid user the driver is determined as through a low-speed authentication process. The mobile device 400 and the server 1800 may respectively configure the plurality of sub-neural networks 1000-1, 1000-2, . . . , and 1000-$n$ and the integration neural network 1630 with a parameter set corresponding to the valid user determined through the low-speed authentication process.

Referring to FIG. 19, the first to nth sub-neural networks 1000-1, 1000-2, . . . , and 1000-$n$ may be stored in the electronic device 100, and (n+1)th to mth sub-neural networks 1000-$n$+1, 1000-$n$+2, . . . , 1000-$n$+m may be stored in the mobile device 400. The integration neural network 1630 may be stored in the server 1800.

The first authentication module 130 of the electronic device 100 applies sensing data obtained by a sensor of a vehicle, to the first to nth sub-neural networks 1000-1, 1000-2, . . . , and 1000-$n$, and transmits output data of the first to nth sub-neural networks 1000-1, 1000-2, . . . , and 1000-$n$ to the server 1800.

The mobile device 400 applies sensing data obtained by a sensor of the mobile device 400, to the (n+1)th to mth sub-neural networks 1000-$n$+1, 1000-$n$+2, . . . , and 1000-$n$+m, and transmit output data of the (n+1)th to mth sub-neural networks 1000-$n$+1, 1000-$n$+2, . . . , and 1000-$n$+m to the server 1800, at a request of the electronic device 100.

The server 1800 applies, to the integration neural network 1630, the data received from the electronic device 100 and the mobile device 400. The server 1800 transmits data indicating whether the driver corresponds to a valid user, which is output from the integration neural network 1630, to the electronic device 100.

The electronic device 100 may determine whether the driver corresponds to a valid user, based on the data received from the server 1800.

As described above, when parameter sets corresponding to a plurality of valid users are stored individually, the electronic device 100 may transmit, to the mobile device 400 and the server 1800, information indicating which valid user the driver is determined as through a low-speed authentication process. The electronic device 100, the mobile device 400, and the server 1800 may respectively configure the sub-neural networks and the integration neural network 1630 with a parameter set corresponding to the valid user determined through the low-speed authentication process.

A method of storing the plurality of sub-neural networks and the integration neural network 1630 in the electronic device 100, the mobile device 400, and the server 1800 in a distributed manner is not limited to the embodiment of the disclosure shown in FIG. 18 or 19. For example, the integration neural network 1630 may be stored in the mobile device 400, and the sub-neural networks may be stored in the server 1800.

Figure 20:
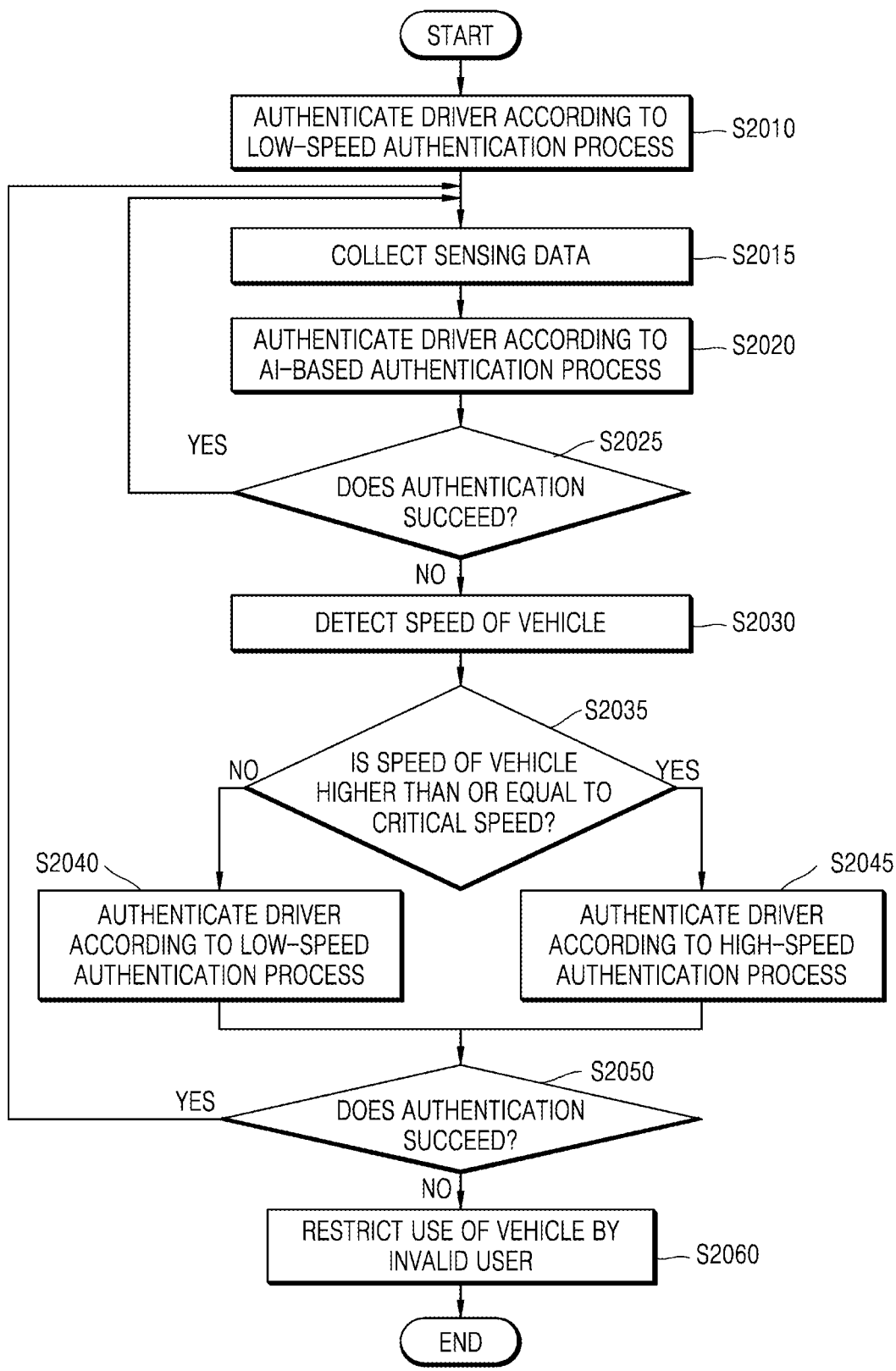
FIG. 20 is a flowchart illustrating an example method of authenticating a driver, according to various embodiments.

FIG. 20 is a flowchart illustrating an example method of authenticating a driver, according to various embodiments.

In operation S2010, the electronic device 100 authenticates a driver according to a low-speed authentication process before or after the driver gets in a vehicle. The electronic device 100 may determine which valid user the driver corresponds to from among a plurality of valid users, through the low-speed authentication process. When the authentication of the driver through the low-speed authentication process fails, the electronic device 100 may restrict use of the vehicle by the driver.

In operation S2015, the electronic device 100 collects sensing data through a sensor of a mobile device of the driver and/or the vehicle while the driver is using the vehicle.

In operation S2020, the electronic device 100 authenticates the driver using the sensing data according to an AI-based authentication process.

In operation S2025, the electronic device 100 determines whether the authentication of the driver through the AI-based authentication process succeeds. When the authentication of the driver succeeds, the driver is determined as a valid user, and when the authentication of the driver fails, the driver is determined as an invalid user.

When the authentication of the driver through the AI-based authentication process succeeds, the electronic device 100 repeatedly authenticates the driver by periodically performing operations S2015 and S2020.

In an embodiment of the disclosure, when the authentication of the driver through the AI-based authentication process succeeds, the electronic device 100 may allow use of a certain service by the driver. For example, when the driver requests to use a car-pay service, the electronic device 100 may allow the car-pay service for the driver successfully authenticated through the AI-based authentication process. The service allowed for the electronic device 100 to use is not limited to the car-pay service. The electronic device 100 may determine whether to allow various types of services available only to a valid user of the vehicle.

In an embodiment of the disclosure, when the authentication of the driver through the AI-based authentication process succeeds, the electronic device 100 may allow log-in to a certain application, access to an operating system (OS), and/or access to a vehicle system by the driver.

According to an embodiment of the disclosure, the electronic device 100 does not require a specific action of the driver, which is generally needed to authenticate the driver for use of a certain service, log in to an application, or the like, and thus safe driving of the vehicle may be ensured.

When the authentication of the driver through the AI-based authentication process fails, in operation S2030, the electronic device 100 detects a speed of the vehicle.

In operation S2035, the electronic device 100 determines whether the speed of the vehicle is greater than or equal to a critical speed. The critical speed may be preset in the electronic device 100.

When the speed of the vehicle is less than the critical speed, in operation S2040, the electronic device 100 authenticates the driver according to the low-speed authentication process, and when the speed of the vehicle is greater than or equal to the critical speed, in operation S2045, the electronic device 100 authenticates the driver according to a high-speed authentication process.

In operation S2050, the electronic device 100 determines whether the authentication of the driver according to the low-speed authentication process or the high-speed authentication process succeeds.

When the authentication of the driver succeeds through the low-speed authentication process or the high-speed authentication process, the electronic device 100 repeatedly authenticates the driver by periodically performing operations S2015 and S2020.

When the authentication of the driver fails through the low-speed authentication process or the high-speed authentication process, in operation S2060, the electronic device 100 restricts use of the vehicle by an invalid user.

In an embodiment of the disclosure, the electronic device 100 may transmit a message indicating that an unauthorized user is driving the vehicle, to a phone number of a prestored valid user or a police station.

In an embodiment of the disclosure, the electronic device 100 may stop the vehicle in a nearby parking area by activating an autonomous driving function of the vehicle.

In an embodiment of the disclosure, in operation S2025, when it is determined through the AI-based authentication process that the authentication of the driver fails, the electronic device 100 may authenticate the driver according to the high-speed authentication process, and when the authentication of the driver also fails through the high-speed authentication process, the electronic device 100 may authenticate the driver according to the low-speed authentication process. As such, because the high-speed authentication process requires less driver actions compared to the low-speed authentication process, the driver may better focus on driving. When the authentication of the driver also fails through the low-speed authentication process, the electronic device 100 may restrict use of the vehicle by an invalid user.

In an embodiment of the disclosure, in operation S2025, when it is determined through the AI-based authentication process that the authentication of the driver fails, the electronic device 100 may authenticate the driver according to the low-speed authentication process, and when the authentication of the driver also fails through the low-speed authentication process, the electronic device 100 may authenticate the driver according to the high-speed authentication process.

In an embodiment of the disclosure, the low-speed authentication process and/or the high-speed authentication process may be divided into sub-processes based on the speed of the vehicle.

Figure 21:
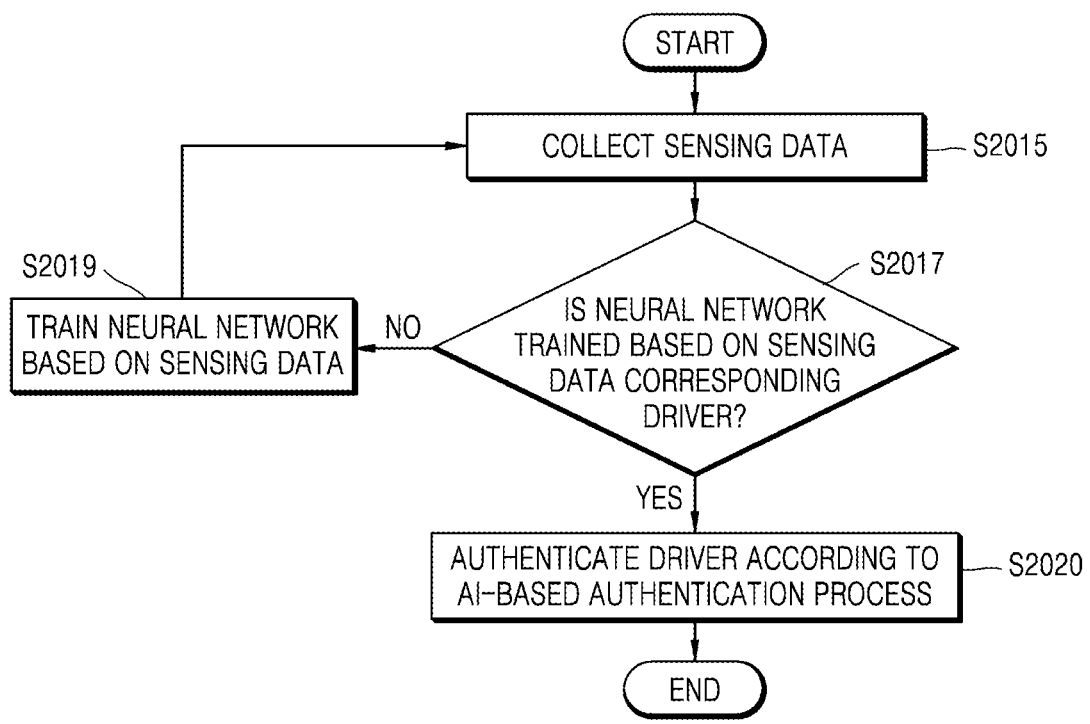
FIG. 21 is a flowchart illustrating operations S2015 and S2020 shown in FIG. 20 according to various embodiments.

FIG. 21 is a flowchart illustrating additional details of operations S2015 and S2020 shown in FIG. 20, and illustrates an example in which a driver is set as a new valid user and thus a neural network is not trained based on the driver according to various embodiments.

It is assumed, for convenience and for purposes of describing FIG. 21, that the driver set as a new valid user is successfully authenticated through a low-speed authentication process.

In operation S2015, the electronic device 100 collects sensing data corresponding to the driver while the driver is using a vehicle.

In operation S2017, the electronic device 100 determines whether the neural network is trained based on the sensing data corresponding to the driver. When the driver is assigned as a new valid user, because the neural network which is not trained based on sensing data of the new valid user will not determine the driver as a valid user, it is first determined whether the neural network is trained.

When the neural network is trained based on the sensing data corresponding to the driver, in operation S2020, the electronic device 100 authenticates the driver using the sensing data according to an AI-based authentication process.

When the neural network is not trained based on the sensing data corresponding to the driver, in operation S2019, the electronic device 100 trains the neural network based on the sensing data corresponding to the driver. A method of training the neural network is described above in relation to FIG. 11, and thus a detailed description thereof is not provided herein.

The AI-based authentication process may not be performed while the neural network is being trained.

When the training of the neural network is completed, in operations S2015 and S2020, the authentication of the driver based on the AI-based authentication process may be periodically performed.

Meanwhile, the above-described AI-based authentication process may also be performed by the mobile device 400 based on the neural network 1000 and, in this case, convenience of the driver to use the vehicle may be increased.

For example, before a user of the mobile device 400 gets in the vehicle, the mobile device 400 determines whether the user of the mobile device 400 (e.g., the driver) is a valid user of the vehicle, by applying sensing data obtained through a sensor of the mobile device 400, to the neural network 1000. When the user of the mobile device 400 (e.g., the driver) is determined as a valid user of the vehicle and when a distance between the mobile device 400 and the vehicle is reduced within a preset distance, the mobile device 400 may transmit, to the electronic device 100 of the vehicle, a message indicating that a valid user will get in the vehicle. Then, as the driver corresponding to a valid user approaches, the electronic device 100 of the vehicle may automatically open a door of or start the vehicle such that the driver may conveniently use the vehicle.

In an embodiment of the disclosure, at least one of operations performed by the control module 110, the first authentication module 130, and the second authentication module 150 may be performed using AI technology. The operation performed using AI technology will now be described in greater detail below with reference to FIG. 22.

Figure 22:
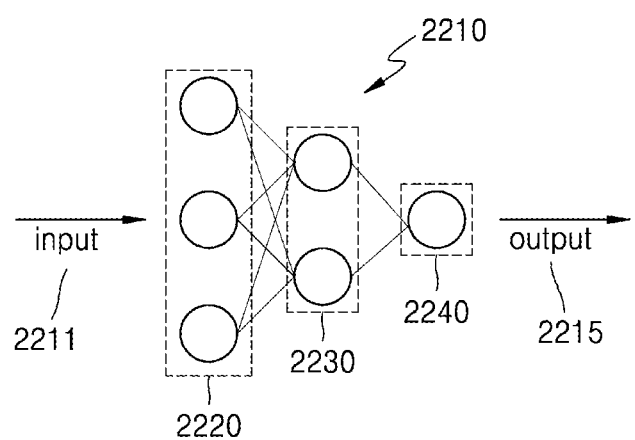
FIG. 22 is a diagram illustrating an example operation performed using AI technology, according to various embodiments.

FIG. 22 is a diagram illustrating an example operation performed using AI technology, according to various embodiments.

For example, at least one of i) an operation of determining an authentication process to be used to authenticate a driver, ii) an operation of authenticating the driver according to a low-speed authentication process or a high-speed authentication process, iii) an operation of selecting sensing data used in an AI-based authentication process, iv) an operation of authenticating the driver according to the AI-based authentication process, and/or v) an operation of selecting a method of restricting use of a vehicle by an invalid user, which is performed by the electronic device 100, (hereinafter referred to as an operation of the electronic device 100) may be performed using AI technology for performing calculation through a neural network. For example, it may be performed based on AI on the basis of a communication status between a server (not shown) and the vehicle.

The AI technology may refer, for example, to a technology for obtaining a desired result by processing, e.g., analyzing and/or classifying, input data based on calculation through a neural network.

The AI technology may be implemented using algorithms. Herein, an algorithm or a set of algorithms for implementing the AI technology may be referred to as a neural network. The neural network may receive input data, perform calculation for the above-described analysis and/or classification, and output resultant data. In order for the neural network to accurately output the resultant data corresponding to the input data, the neural network needs to be trained. Herein, when the neural network is 'trained', it may refer, for example, to the neural network being trained to autonomously discover or learn a method of analyzing data input to the neural network, a method of classifying the input data, and/or a method of extracting, from the input data, feature data required to generate resultant data. For example, through training, the neural network may be trained based on training data to optimize weight values (or parameters) in the neural network. A desired result is output by processing input data through the neural network having the optimized weight values.

When the neural network includes a plurality of hidden layers performing calculation, e.g., when a depth of the neural network performing calculation increases, the neural network may be classified as a deep neural network. The neural network may include, for example, and without limitation, a convolutional neural network (CNN), a deep neural network (DNN), a recurrent neural network (RNN), a restricted Boltzmann machine (RBM), a deep belief network (DBN), a bidirectional recurrent deep neural network (BRDNN), and/or a deep Q-network, but is not limited thereto. The neural network may be subdivided. For example, the CNN may be subdivided into a deep convolutional neural network (DCNN) or a CapsNet (not shown).

An 'AI model' may refer to a neural network including at least one layer configured to receive input data and output a desired result. The 'AI model' may also refer to an algorithm for performing calculation through a neural network to output a desired result, a set of a plurality of algorithms, a processor for executing an algorithm (or a set of algorithms), software for executing an algorithm (or a set of algorithms), or hardware for executing an algorithm (or a set of algorithms).

Referring to FIG. 22, a neural network 2210 may be trained by receiving training data. The trained neural network 2210 may receive input data 2211 (e.g., information related to a vehicle (e.g., a speed of the vehicle or a load of an electronic control unit (ECU) in the vehicle), ambient information of the vehicle, or information related to a network available at a current location of the vehicle (e.g., a network type, an available bandwidth, or quality of signals transmitted or received in the bandwidth) through, for example, an input layer 2220, and the input layer 2220, a hidden layer 2230, and an output layer 2240 may perform calculation for outputting output data 2215 by analyzing the input data 2211 and data received from a previous layer.

Although one hidden layer 2230 is shown in FIG. 22, one is merely an example and the hidden layer 2230 may include a plurality of layers.

As an example, the neural network 2210 may learn a method of determining an authentication process to be used to authenticate a driver, based on the information related to the vehicle and/or the ambient information of the vehicle. The completely trained neural network 2210 may receive information related to the vehicle and/or ambient information of the vehicle, and determine an authentication process to be used to authenticate a driver.

As another example, the neural network 2210 may learn about at least one of a method of restricting use of a vehicle by an invalid user, a method of selecting sensing data used in an AI-based authentication process, a method of authenticating a driver according to the AI-based authentication process, or a method of authenticating the driver according to a low-speed authentication process or a high-speed authentication process.

In an embodiment of the disclosure, the neural network performing the operation of the electronic device 100 may be implemented in a control module (e.g., the control module 110 of FIG. 1).

The above-described neural network performing the operation of the electronic device 100 may be implemented in a processor (not shown) or a separate electronic device (not shown) other than the electronic device 100.

The above-described calculation through the neural network may also be performed by a server (not shown) capable of communicating with the electronic device 100 according to an embodiment of the disclosure through a wireless communication network. The communication between the electronic device 100 and the server (not shown) will now be described with reference to FIGS. 23 and 24.

Figure 23:
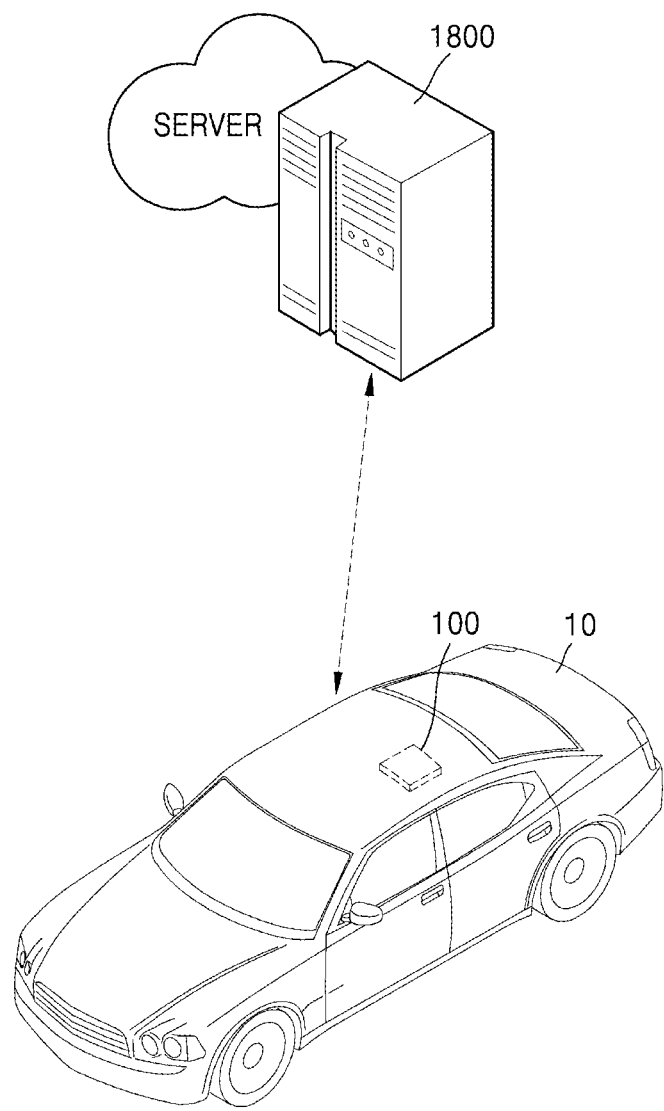
FIG. 23 is a diagram illustrating a server and an electronic device mounted on a vehicle, according to various embodiments.

FIG. 23 is a diagram illustrating an example server 1800 and electronic device 100 mounted on a vehicle 10, according to various embodiments.

In an embodiment of the disclosure, at least one of i) an operation of determining an authentication process to be used to authenticate a driver, ii) an operation of authenticating the driver according to a low-speed authentication process or a high-speed authentication process, iii) an operation of selecting sensing data used in an AI-based authentication process, iv) an operation of authenticating the driver according to the AI-based authentication process, and/or v) an operation of selecting a method of restricting use of the vehicle 10 by an invalid user may be performed by the server 1800, and the result of performing may be transmitted to the electronic device 100 located in the vehicle 10. The server 1800 may transmit or receive data to or from the electronic device 100 through a communication network and process the data.

In an embodiment of the disclosure, a separate electronic device mounted on the vehicle 10 may receive, from the server 1800, the result of performing at least one of i) the operation of determining an authentication process to be used to authenticate a driver, ii) the operation of authenticating the driver according to a low-speed authentication process or a high-speed authentication process, iii) the operation of selecting sensing data used in an AI-based authentication process, iv) the operation of authenticating the driver according to the AI-based authentication process, and/or v) the operation of selecting a method of restricting use of the vehicle 10 by an invalid user, and transmit the received result to the electronic device 100. In this case, the electronic device 100 may operate according to the received result.

The server 1800 may include a server, server system, server-based device, or the like capable of transmitting or receiving data to or from the electronic device 100 through a communication network and of processing the data.

Figure 24:
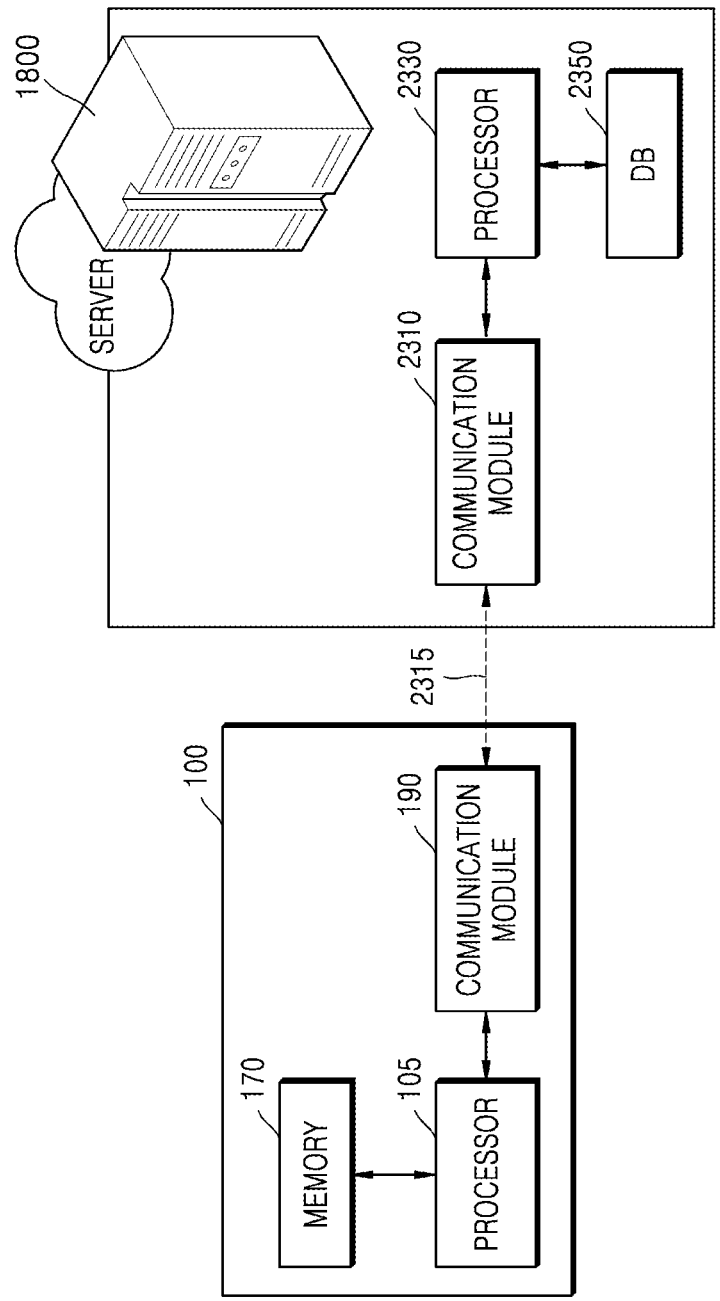
FIG. 24 is a diagram illustrating a server, and an electronic device operating in association with the server according to various embodiments.

Referring to FIG. 24, the server 1800 includes a communication module (e.g., including communication circuitry) 2310 configured to communicate with the electronic device 100, and a processor (e.g., including processing circuitry) 2330 configured to execute one or more instructions.

As an example, the processor 2330 of the server 1800 may receive information related to the vehicle 10 and/or ambient information of the vehicle 10, and determine an authentication process to be used to authenticate a driver. The communication module 2310 may transmit, to the electronic device 100, information indicating the authentication process to be used to authenticate the driver.

As another example, the processor 2330 of the server 1800 may determine a method of restricting use of the vehicle 10 by an invalid user. The communication module 2310 may transmit, to the electronic device 100, information indicating the method of restricting use of the vehicle 10 by an invalid user.

In an embodiment of the disclosure, the server 1800 may perform the operation of the electronic device 100 by performing calculation through the neural network 2210 as described above in relation to FIG. 22. For example, the server 1800 may train an AI model and store the trained AI model. The server 1800 may perform the above-described operation of the electronic device 100 using the trained AI model.

In general, the electronic device 100 may be inferior to the server 1800 in memory capacity, calculation speed, training dataset collection capability, etc. Therefore, an operation requiring a large amount of data or calculation may be performed by the server 1800, and then required data and/or AI model may be transmitted through a communication network the electronic device 100. Then, without a large-capacity memory and a high-speed processor, the electronic device 100 may rapidly and easily perform a required operation by receiving and using the required data and/or AI model from the server 1800.

In an embodiment of the disclosure, the server 1800 may include the neural network 2210 described above in relation to FIG. 22. For example, the neural network 2210 included in the server 1800 may perform calculation for the above-described operation of the electronic device 100.

The communication module 190 of the electronic device 100 may include various communication circuitry and communicates with an external device through a wireless communication network 2315. Herein, the external device may include the server 1800 capable of performing at least one of calculations required by the electronic device 100, or of transmitting data required by the electronic device 100.

The communication module 190 includes at least one communication module including various communication circuitry such as a short-range wireless communication module, a wired communication module, a mobile communication module, or a broadcast receiver module. Herein, the communication module 190 includes a tuner for receiving broadcast signals, or a communication module capable of transmitting or receiving data through a network according to a communication standard such as Bluetooth, wireless local area network (WLAN) (or Wi-Fi), wireless broadband (WiBro), worldwide interoperability for microwave access (WiMAX), code division multiple access (CDMA), wideband code division multiple access (WCDMA), Internet, $3^{rd}$ generation (3G), $4^{th}$ generation (4G), $5^{th}$ generation (5G), and/or millimeter wave (mmWave).

For example, when the communication module 190 performs communication using mmWave, a large amount of data may be rapidly transmitted or received. Specifically, the vehicle 10 may rapidly receive a large amount data using mmWave, and rapidly provide data required for safety of the vehicle 10 (e.g., data required for autonomous driving or a navigation service) or user contents (e.g., video or music), thereby increasing vehicle safety and/or user convenience.

The communication module 190 may communicate with another device located at a remote place (e.g., the server 1800) through a communication network according to a communication standard such as 3G, 4G, and/or 5G. Herein, the communication module 190 communicating with the other device located at a remote place may be referred to as 'a telecommunication module'.

The communication module 2310 of the server 1800 may include one or more elements capable of enabling communication with the electronic device 100. A specific configuration of the communication module 2310 equally corresponds to that of the above-described communication module 190, and thus a detailed description thereof is not provided herein.

For example, the communication module 2310 may communicate with another device located at a remote place (e.g., the electronic device 100) through a communication network according to a communication standard such as Internet, 3G, 4G, and/or 5G.

The processor 2330 may include various processing circuitry and controls overall operations of the server 1800. For example, the processor 2330 may perform required operations by executing at least one of one or more instructions or programs of the server 1800.

A database (DB) 2350 may include a memory (not shown), and the memory (not shown) may store at least one of one or more instructions, programs, or data required for the server 1800 to perform a certain operation. The DB 2350 may also store data required for the server 1800 to perform calculation based on a neural network.

In an embodiment of the disclosure, the server 1800 may store the neural network 2210 described above in relation to FIG. 22. The neural network 2210 may be stored in at least one of the processor 2330 or the DB 2350. The neural network 2210 included in the server 1800 may be a completely trained neural network.

In an embodiment of the disclosure, the server 1800 may perform the above-described operation of the electronic device 100 using a neural network included therein, and transmit resultant data through the communication module 2310 to the communication module 190 of the electronic device 100.

The server 1800 may transmit a completely trained neural network through the communication module 2310 to the communication module 190 of the electronic device 100. Then, the electronic device 100 may obtain and store the completely trained neural network, and obtain desired output data through the neural network.

Figure 25:
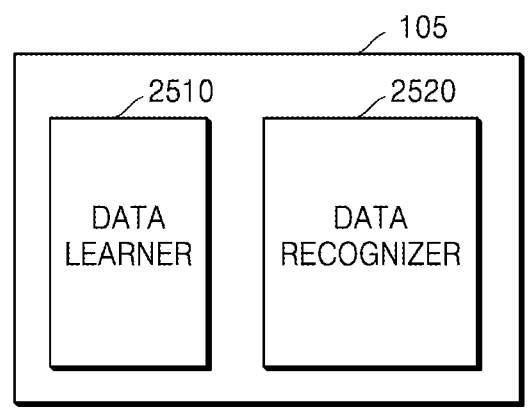
FIG. 25 is a block diagram illustrating an example configuration of a processor included in an electronic device, according to various embodiments.

FIG. 25 is a block diagram illustrating an example configuration of a processor 105 included in the electronic device 100, according to various embodiments.

Referring to FIG. 25, the processor 105 according to an embodiment of the disclosure may include a data learner (e.g., including various processing circuitry and/or executable program instructions) 2510 and a data recognizer (e.g., including various processing circuitry and/or executable program instructions) 2520.

The data learner 2510 may learn a criterion for an operation of the electronic device 100.

For example, the data learner 2510 may learn a criterion about which data to use for the operation of the electronic device 100 or how to perform the operation of the electronic device 100 using the data.

The data learner 2510 may learn the criterion for the operation of the electronic device 100 by obtaining data to be used for training, and applying the obtained data to a data recognition model described below.

The data recognizer 2520 may perform the operation of the electronic device 100 based on at least one of information related to the vehicle 10, ambient information of the vehicle 10, or information related to a network available at a current location of the vehicle 10.

A resultant value output by the data recognition model may be used to update the data recognition model.

At least one of the data learner 2510 or the data recognizer 2520 may be produced in the form of at least one hardware chip and mounted on the electronic device 100. For example, at least one of the data learner 2510 or the data recognizer 2520 may be produced in the form of a dedicated hardware chip for AI or as a part of a general-purpose processor (e.g., a central processing unit (CPU) or an application processor) or a dedicated graphics processor (e.g., a graphics processing unit (GPU)) and mounted on the above-described electronic device 100.

The data learner 2510 and the data recognizer 2520 may be mounted on one electronic device 100, or separately mounted on different devices. For example, one of the data learner 2510 and the data recognizer 2520 may be included in the electronic device 100, and the other may be included in the server 1800. The data learner 2510 and the data recognizer 2520 may be connected in a wired or wireless manner such that model data constructed by the data learner 2510 may be provided to the data recognizer 2520 or data input to the data recognizer 2520 may be provided to the data learner 2510 as additional training data.

Meanwhile, at least one of the data learner 2510 or the data recognizer 2520 may be implemented as a software module. When at least one of the data learner 2510 or the data recognizer 2520 is implemented as a software module (or a program module including instructions), the software module may be stored in non-transitory computer-readable media. In this case, at least one software module may be provided by an OS or by a certain application. A part of at least one software module may be provided by an OS, and the other part may be provided by a certain application.

Figure 26:
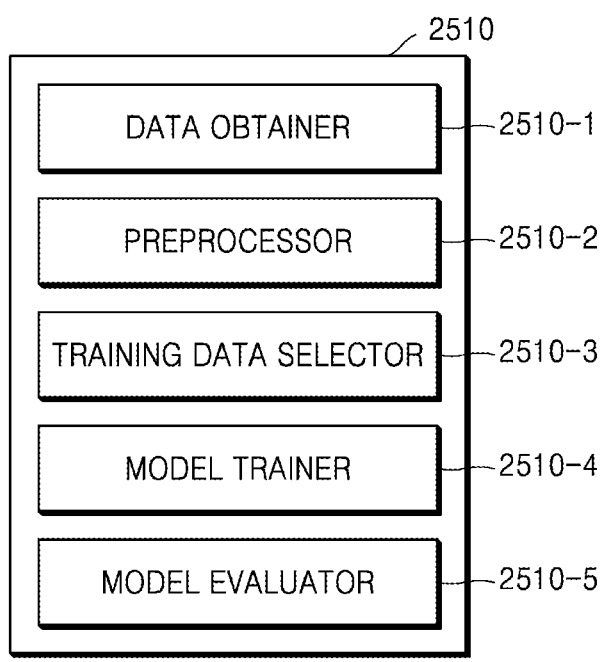
FIG. 26 is a block diagram illustrating an example configuration of a data learner according to various embodiments.

FIG. 26 is a block diagram illustrating an example configuration of the data learner 2510 according to an embodiment of the disclosure.

Referring to FIG. 26, the data learner 2510 according to an embodiment of the disclosure may include a data obtainer 2510-1, a preprocessor 2510-2, a training data selector 2510-3, a model trainer 2510-4, and a model evaluator 2510-5, each of which may include various processing circuitry and/or executable program instructions.

The data obtainer 2510-1 may obtain data required for an operation of the electronic device 100.

The data obtainer 2510-1 may obtain data required for training to perform the operation of the electronic device 100.

The preprocessor 2510-2 may preprocess the data obtained for training. The preprocessor 2510-2 may process the data to a preset format in such a manner that the model trainer 2510-4 may use the data for training to perform the operation of the electronic device 100.

The training data selector 2510-3 may select data required for training in the preprocessed data. The selected data may be provided to the model trainer 2510-4. The training data selector 2510-3 may select the data required for training in the preprocessed data, according to a preset criterion for the operation of the electronic device 100. The training data selector 2510-3 may also select the data according to a preset criterion learned by the model trainer 2510-4 described below.

The model trainer 2510-4 may learn a criterion about how to perform the operation of the electronic device 100. The model trainer 2510-4 may also learn a criterion about which training data to use for the operation of the electronic device 100.

The model trainer 2510-4 may train a data recognition model used for the operation of the electronic device 100, using the training data. In this case, the data recognition model may be a pre-constructed model. For example, the data recognition model may be a model pre-constructed by receiving basic training data (e.g., sample data).

The data recognition model may be constructed in consideration of an applicable field of the recognition model, a purpose of learning, computing performance of a device, or the like. The data recognition model may be, for example, a model based on a neural network. For example, the data recognition model may use a CNN, a DNN, an RNN, or a BRDNN, but is not limited thereto.

According to various embodiments of the disclosure, when a plurality of pre-constructed data recognition models are present, the model trainer 2510-4 may determine, as a data recognition model to be trained, a data recognition model with a high correlation between input training data and basic training data. In this case, the basic training data may be pre-classified for each data type, and the data recognition model may be pre-constructed for each data type. For example, the basic training data may be pre-classified based on various criteria such as a region where the training data is created, a time when the training data is created, a size of the training data, a genre of the training data, a creator of the training data, types of objects in the training data, etc.

The model trainer 2510-4 may train the data recognition model using, for example, a learning algorithm including error back-propagation or gradient descent.

The model trainer 2510-4 may train the data recognition model through, for example, supervised learning which uses training data as an input value. The model trainer 2510-4 may train the data recognition model through, for example, unsupervised learning for discovering a criterion for performing the operation of the electronic device 100, by autonomously learning a type of data required for the operation of the electronic device 100 without any supervision. The model trainer 2510-4 may train the data recognition model through, for example, reinforcement learning.

When the data recognition model is trained, the model trainer 2510-4 may store the trained data recognition model. In this case, the model trainer 2510-4 may store the trained data recognition model in the memory 170 of the electronic device 100 including the data recognizer 2520. The model trainer 2510-4 may store the trained data recognition model in a memory of the server 1800 connected to the electronic device 100 through a wired or wireless network.

In this case, the memory where the trained data recognition model is stored may also store, for example, commands or data related to at least one other element of the electronic device 100. The memory may also store software and/or programs. The programs may include, for example, a kernel, middleware, application programming interfaces (APIs), and/or application programs (or "applications").

The model evaluator 2510-5 may input evaluation data to the data recognition model, and request the model trainer 2510-4 to train the data recognition model again, when recognition results output based on the evaluation data do not satisfy a certain criterion. In this case, the evaluation data may be preset data for evaluating the data recognition model.

For example, when the number or a rate of incorrect recognition results from among the recognition results of the data recognition model based on the evaluation data is greater than a preset threshold, the model evaluator 2510-5 may evaluate that the certain criterion is not satisfied. For example, when the certain criterion is defined as a rate of 2%, and when the data recognition model outputs wrong recognition results for more than 20 evaluation data out of a total of 1,000 evaluation data, the model evaluator 2510-5 may evaluate that the data recognition model is not proper.

Meanwhile, when a plurality of trained data recognition models are present, the model evaluator 2510-5 may evaluate whether each trained data recognition model satisfies the certain criterion, and determine, as a final data recognition model, a model satisfying the certain criterion. In this case, when a plurality of models satisfy the certain criterion, the model evaluator 2510-5 may determine, as the final data recognition model, any one or a certain number of models preset in the order of evaluation score.

Meanwhile, at least one of the data obtainer 2510-1, the preprocessor 2510-2, the training data selector 2510-3, the model trainer 2510-4, or the model evaluator 2510-5 in the data learner 2510 may be produced in the form of at least one hardware chip and mounted on the electronic device 100. For example, at least one of the data obtainer 2510-1, the preprocessor 2510-2, the training data selector 2510-3, the model trainer 2510-4, or the model evaluator 2510-5 may be produced in the form of a dedicated hardware chip for AI or as a part of a general-purpose processor (e.g., a CPU or an application processor) or a dedicated graphics processor (e.g., a GPU) and mounted on the above-described electronic device 100.

The data obtainer 2510-1, the preprocessor 2510-2, the training data selector 2510-3, the model trainer 2510-4, and the model evaluator 2510-5 may be mounted on one electronic device 100, or separately mounted on different devices. For example, some of the data obtainer 2510-1, the preprocessor 2510-2, the training data selector 2510-3, the model trainer 2510-4, and the model evaluator 2510-5 may be included in the electronic device 100, and the others may be included in the server 1800.

At least one of the data obtainer 2510-1, the preprocessor 2510-2, the training data selector 2510-3, the model trainer 2510-4, or the model evaluator 2510-5 may be implemented as a software module. When at least one of the data obtainer 2510-1, the preprocessor 2510-2, the training data selector 2510-3, the model trainer 2510-4, or the model evaluator 2510-5 is implemented as a software module (or a program module including instructions), the software module may be stored in non-transitory computer-readable media. In this case, at least one software module may be provided by an OS or by a certain application. Alternatively, a part of at least one software module may be provided by an OS, and the other part may be provided by a certain application.

Figure 27:
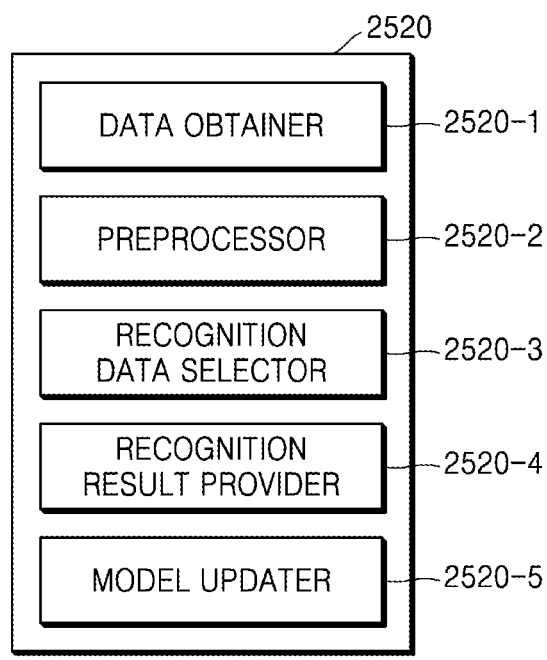
FIG. 27 is a block diagram illustrating an example configuration of a data recognizer according to various embodiments.

FIG. 27 is a block diagram illustrating an example configuration of the data recognizer 2520 according to various embodiments.

Referring to FIG. 27, the data recognizer 2520 according to an embodiment of the disclosure may include a data obtainer 2520-1, a preprocessor 2520-2, a recognition data selector 2520-3, a recognition result provider 2520-4, and a model updater 2520-5, each of which may include various processing circuitry and/or executable program instructions.

The data obtainer 2520-1 may obtain data required for an operation of the electronic device 100, and the preprocessor 2520-2 may preprocess the obtained data. The preprocessor 2520-2 may process the obtained data to a preset format in such a manner that the recognition result provider 2520-4 described below may use the data for the operation of the electronic device 100.

The recognition data selector 2520-3 may select data required for the operation of the electronic device 100 in the preprocessed data. The selected data may be provided to the recognition result provider 2520-4. The recognition data selector 2520-3 may also select the data according to a preset criterion learned by the model trainer 2510-4.

The recognition result provider 2520-4 may perform the operation of the electronic device 100 by applying the selected data to a data recognition model. The recognition result provider 2520-4 may provide a recognition result based on a purpose of data recognition. The recognition result provider 2520-4 may apply the selected data to the data recognition model, using, as an input value, the data selected by the recognition data selector 2520-3. The recognition result may be determined by the data recognition model.

The model updater 2520-5 may control the data recognition model to be updated, based on evaluation of the recognition result provided by the recognition result provider 2520-4. For example, the model updater 2520-5 may request the model trainer 2510-4 to update the data recognition model, by providing, to the model trainer 2510-4, the recognition result provided by the recognition result provider 2520-4.

Meanwhile, at least one of the data obtainer 2520-1, the preprocessor 2520-2, the recognition data selector 2520-3, the recognition result provider 2520-4, or the model updater 2520-5 in the data recognizer 2520 may be produced in the form of at least one hardware chip and mounted on the electronic device 100. For example, at least one of the data obtainer 2520-1, the preprocessor 2520-2, the recognition data selector 2520-3, the recognition result provider 2520-4, or the model updater 2520-5 may be produced in the form of a dedicated hardware chip for AI or as a part of a general-purpose processor (e.g., a CPU or an application processor) or a dedicated graphics processor (e.g., a GPU) and mounted on the above-described electronic device 100.

The data obtainer 2520-1, the preprocessor 2520-2, the recognition data selector 2520-3, the recognition result provider 2520-4, and the model updater 2520-5 may be mounted on one electronic device 100, or separately mounted on different devices. For example, some of the data obtainer 2520-1, the preprocessor 2520-2, the recognition data selector 2520-3, the recognition result provider 2520-4, and the model updater 2520-5 may be included in the electronic device 100, and the others may be included in the server 1800.

At least one of the data obtainer 2520-1, the preprocessor 2520-2, the recognition data selector 2520-3, the recognition result provider 2520-4, or the model updater 2520-5 may be implemented as a software module. When at least one of the data obtainer 2520-1, the preprocessor 2520-2, the recognition data selector 2520-3, the recognition result provider 2520-4, or the model updater 2520-5 is implemented as a software module (or a program module including instructions), the software module may be stored in non-transitory computer-readable media. In this case, at least one software module may be provided by an OS or by a certain application. Alternatively, a part of at least one software module may be provided by an OS, and the other part may be provided by a certain application.

Figure 28:
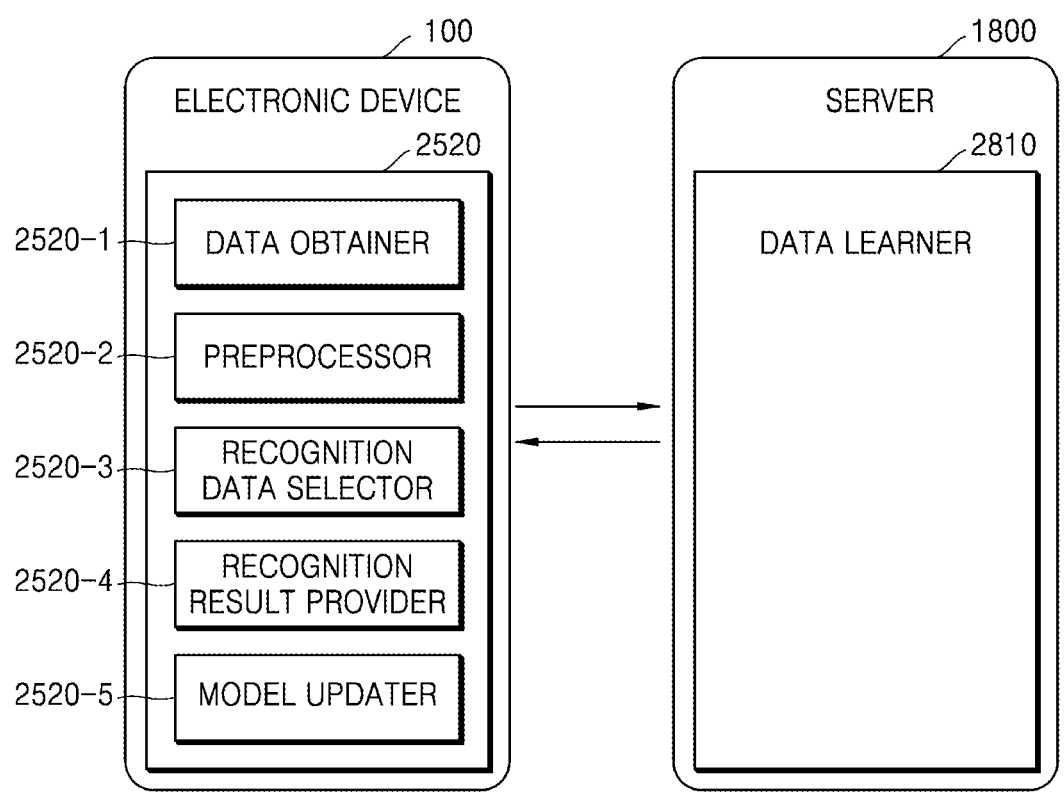
FIG. 28 is a diagram illustrating an example in which an electronic device and a server learn and recognize data in association with each other, according to various embodiments.

FIG. 28 is a diagram illustrating an example in which the electronic device 100 and the server 1800 learn and recognize data in association with each other, according to various embodiments.

Referring to FIG. 28, the server 1800 may learn a criterion for an operation of the electronic device 100, and the electronic device 100 may perform the operation of the electronic device 100 based on the result of learning by the server 1800.

In this case, a data learner 2810 of the server 1800 may perform the function of the data learner 2510 illustrated in FIG. 26. The data learner 2810 of the server 1800 may learn a criterion about which data to use to determine a certain situation. The data learner 2810 may learn a criterion about the operation of the electronic device 100 using the data. The data learner 2810 may learn the criterion for the operation of the electronic device 100 by obtaining data to be used for training, and applying the obtained data to a data recognition model.

The recognition result provider 2520-4 of the electronic device 100 may perform the operation of the electronic device 100 by applying data selected by the recognition data selector 2520-3, to a data recognition model created by the server 1800. For example, the recognition result provider 2520-4 may transmit the data selected by the recognition data selector 2520-3, to the server 1800 to request the server 1800 to perform the operation of the electronic device 100 by applying the data selected by the recognition data selector 2520-3, to the recognition model. The recognition result provider 2520-4 may receive, from the server 1800, a result of the operation performed by the server 1800.

The recognition result provider 2520-4 of the electronic device 100 may receive, from the server 1800, the recognition model created by the server 1800, and perform the operation of the electronic device 100 using the received recognition model. In this case, the recognition result provider 2520-4 of the electronic device 100 may perform the operation of the electronic device 100 by applying the data selected by the recognition data selector 2520-3, to the data recognition model received from the server 1800.

According to an example embodiment of the disclosure, an electronic device mounted on a vehicle to authenticate a driver may include: a first authentication module comprising circuitry configured to determine whether the driver corresponds to a valid user of the vehicle according to an artificial intelligence (AI)-based authentication process, a control module comprising circuitry configured to select a low-speed authentication process or a high-speed authentication process based on a speed of the vehicle, based on determining through the AI-based authentication process that the driver does not correspond to the valid user, and a second authentication module comprising circuitry configured to determine whether the driver corresponds to the valid user according to the authentication process selected by the control module, wherein the AI-based authentication process is configured to be performed based on a neural network configured to process sensing data collected by a sensor of at least one of the vehicle or a mobile device of the driver while the driver is using the vehicle.

The low-speed authentication process may be performed based on at least one of a password input through the mobile device, a password input through a vehicle terminal, biometric data input through the mobile device, or biometric data input through the vehicle terminal.

The high-speed authentication process may be performed based on at least one of a password input by eyes of the driver through a symbol pad displayed on a display, or a temporary password uttered by the driver.

The symbol pad may include a plurality of symbols provided at different locations, temporary symbols may be allocated to the plurality of symbols, and the temporary password may include temporary symbols allocated to symbols of the password.

The control module may be further configured to: allow use of a specified service by the driver, log-in to a certain application by the driver, access to an operating system (OS) by the driver, or access to a vehicle system by the driver, based on determining through the AI-based authentication process that the driver corresponds to the valid user.

The AI-based authentication process may be performed after it is determined according to the low-speed authentication process that the driver corresponds to the valid user.

The second authentication module may be further configured to: determine that the driver corresponds to a first valid user from among one or more valid users, according to the low-speed authentication process before the AI-based authentication process is performed, and the first authentication module may be further configured to configure the neural network with a parameter set corresponding to the first valid user from among a plurality of parameter sets.

The neural network may be further configured to: output a probability value that the driver corresponds to the first valid user as a result of performing the AI-based authentication process, and the first authentication module may be further configured to determine that the driver corresponds to the first valid user based on the probability value being greater than or equal to a specified value.

The second authentication module may be further configured to: determine that the driver corresponds to a second valid user from among one or more valid users, according to the low-speed authentication process before the AI-based authentication process is performed, and the first authentication module may be further configured to train the neural network using sensing data collected while the driver is using the vehicle, based on the neural network not being trained based on sensing data corresponding to the second valid user.

The first authentication module may be further configured to determine whether the driver corresponds to the second valid user, according to the AI-based authentication process based on the training of the neural network being completed.

The neural network may be further configured to output probability values that the driver corresponds to each of one or more valid users, and the first authentication module may be further configured to determine which valid user the driver corresponds to from among the one or more valid users, based on the probability values output from the neural network.

The neural network may include: a first sub-neural network configured to process sensing data collected by a first sensor, a second sub-neural network configured to process sensing data collected by a second sensor, and an integration neural network configured to output data indicating whether the driver corresponds to the valid user, by processing output data of the first sub-neural network and output data of the second sub-neural network.

The first sub-neural network may be stored in the electronic device and be configured to process sensing data collected by a sensor of the vehicle, the second sub-neural network may be stored in the mobile device and configured to process data collected by a sensor of the mobile device, the integration neural network may be stored in a server and configured to process output data of the first sub-neural network received from the electronic device, and output data of the second sub-neural network received from the mobile device, and the first authentication module may be further configured to determine whether the driver corresponds to the valid user, by receiving output data of the integration neural network from the server.

The sensor may include at least one of an acceleration sensor, a gyro sensor, a screen sensor, a camera, a microphone, or a biosensor.

According to an example embodiment of the disclosure, a method, performed by an electronic device, of authenticating a driver of a vehicle includes: determining whether the driver corresponds to a valid user of the vehicle according to an artificial intelligence (AI)-based authentication process, selecting a low-speed authentication process or a high-speed authentication process based on a speed of the vehicle, based on determining through the AI-based authentication process that the driver does not correspond to the valid user, and determining whether the driver corresponds to the valid user, according to the selected authentication process, wherein the AI-based authentication process is performed based on a neural network configured to process sensing data collected by a sensor of at least one of the vehicle or a mobile device of the driver while the driver is using the vehicle.

The method may further include allowing use of a specified service by the driver, log-in to a certain application by the driver, access to an operating system (OS) by the driver, or access to a vehicle system by the driver, when it is determined through the AI-based authentication process that the driver corresponds to the valid user.

The method may further include determining whether the driver corresponds to the valid user, according to the low-speed authentication process before the AI-based authentication process is performed.

The method may further include determining that the driver corresponds to a first valid user from among one or more valid users, according to the low-speed authentication process before the AI-based authentication process is performed, and configuring the neural network with a parameter set corresponding to the first valid user from among a plurality of parameter sets.

The neural network may be further configured to output a probability value that the driver corresponds to the first valid user, as a result of performing the AI-based authentication process, and the determining of whether the driver corresponds to the valid user, according to the AI-based authentication process, may include determining that the driver corresponds to the first valid user, when the probability value is greater than or equal to a preset value.

Meanwhile, the various example embodiments of the disclosure may be written as a computer-executable program, and the written program may be stored in a machine-readable storage medium.

The machine-readable storage medium may be provided in the form of a non-transitory storage medium. When the storage medium is 'non-transitory', the storage medium is tangible and does not include signals (e.g., electromagnetic waves), and it does not limit that data is semi-permanently or temporarily stored in the storage medium. For example, the 'non-transitory storage medium' may include a buffer that stores data temporarily.

According to an embodiment of the disclosure, the method according to various embodiments of the disclosure may be included and provided in a computer program product. The computer program product may be traded as a commercial product between sellers and purchasers. The computer program product may be distributed in the form of a machine-readable storage medium (e.g., a compact disc read only memory (CD-ROM)), or be electronically distributed (e.g., downloaded or uploaded) via an application store or directly between two user devices (e.g., smartphones). For electronic distribution, at least a part of the computer program product (e.g., a downloadable app) may be temporarily generated or be at least temporarily stored in a machine-readable storage medium, e.g., a memory of a server of a manufacturer, a server of an application store, or a relay server.

While the disclosure has been illustrated an described with reference to various example embodiments, it will be understood that the various example embodiments are intended to be illustrative, not limiting. It will be further understood by one skilled in the art that various changes in form and detail may be made without departing from the true spirit and full scope of the disclosure including the following claims and their equivalents. It will also be understood that any of the embodiment(s) described herein may be used in conjunction with any other embodiment(s) described herein.

What is claimed is:

1. A method, performed by an electronic device, of authenticating a driver of a vehicle, the method comprising:
    determining whether the driver corresponds to a valid user of the vehicle, according to an artificial intelligence (AI)-based authentication process;
    selecting a low-speed authentication process or a high-speed authentication process based on a speed of the vehicle, based on determining through the AI-based authentication process that the driver does not correspond to the valid user; and
    determining whether the driver corresponds to the valid user, according to the selected authentication process,
    wherein the AI-based authentication process is configured to be performed based on a neural network configured to process sensing data collected by a sensor of at least one of the vehicle or a mobile device of the driver while the driver is using the vehicle.

2. The method of claim 1, further comprising:
    allowing use of a certain service by the driver, log-in to a certain application by the driver, access to an operating system (OS) by the driver, or access to a vehicle system by the driver, based on determining through the AI-based authentication process that the driver corresponds to the valid user.

3. The method of claim 1, further comprising determining whether the driver corresponds to the valid user, according to the low-speed authentication process before the AI-based authentication process is performed.

4. The method of claim 1, further comprising:
    determining that the driver corresponds to a first valid user from among one or more valid users, according to the low-speed authentication process before the AI-based authentication process is performed; and
    configuring the neural network with a parameter set corresponding to the first valid user from among a plurality of parameter sets.

5. The method of claim 4, wherein the neural network is further configured to output a probability value that the driver corresponds to the first valid user, based on performing the AI-based authentication process, and
    wherein the determining of whether the driver corresponds to the first valid user, according to the AI-based authentication process, comprises determining that the driver corresponds to the first valid user, based on the probability value being greater than or equal to a specified value.

6. The method of claim 1, wherein the low-speed authentication process is performed based on at least one of a password input through the mobile device, a password input through a vehicle terminal, biometric data input through the mobile device, or biometric data input through the vehicle terminal.

7. The method of claim 1, wherein the high-speed authentication process is performed based on at least one of a password input by eyes of the driver through a symbol pad displayed on a display, or a temporary password uttered by the driver.

8. The method of claim 7, wherein the symbol pad comprises a plurality of symbols provided at different locations,
    wherein temporary symbols are allocated to the plurality of symbols, and
    wherein the temporary password includes temporary symbols allocated to symbols of the password.

9. The method of claim 1, wherein, when it is determined that the driver corresponds to a first valid user from among one or more valid users according to the low-speed authentication process before the AI-based authentication process is performed, and, when the neural network is not trained based on sensing data corresponding to the first valid user, the neural network is trained using sensing data collected while the driver is using the vehicle.

10. The method of claim 9, wherein whether the driver corresponds to the first valid user is determined according to the AI-based authentication process, based on training of the neural network being completed.

11. The method of claim 1, wherein the neural network outputs probability values that the driver corresponds to each of one or more valid users, and
    wherein which valid user the driver corresponds to from among the one or more valid users is determined based on the probability values output from the neural network.

12. The method of claim 1, wherein the neural network comprises:
    a first sub-neural network configured to process sensing data collected by a first sensor;
    a second sub-neural network configured to process sensing data collected by a second sensor; and
    an integration neural network configured to output data indicating whether the driver corresponds to the valid user, by processing output data of the first sub-neural network and output data of the second sub-neural network.

13. The method of claim 12, wherein the first sub-neural network is stored in the electronic device and processes sensing data collected by a sensor of the vehicle,
    wherein the second sub-neural network is stored in the mobile device and processes data collected by a sensor of the mobile device,
    wherein the integration neural network is stored in a server and processes output data of the first sub-neural network received from the electronic device, and output data of the second sub-neural network received from the mobile device, and
    wherein whether the driver corresponds to the valid user is determined by receiving output data of the integration neural network from the server.

14. The method of claim 1, wherein the sensor comprises at least one of an acceleration sensor, a gyro sensor, a screen sensor, a camera, a microphone, or a biosensor.

15. A non-transitory computer-readable recording medium having recorded thereon a program for executing operations of claim 1, on a computer.

* * * * *